United States Patent
Horowitz et al.

(10) Patent No.: US 6,236,987 B1
(45) Date of Patent: May 22, 2001

(54) DYNAMIC CONTENT ORGANIZATION IN INFORMATION RETRIEVAL SYSTEMS

(76) Inventors: Damon Horowitz, 130 Frederick St., #106, San Francisco, CA (US) 94117; David B. Shefner, 1 St. Francis Pl., #1509, San Francisco, CA (US) 94107

(*) Notice: Subject to any disclaimer, the term of this patent is extended or adjusted under 35 U.S.C. 154(b) by 0 days.

(21) Appl. No.: 09/054,753

(22) Filed: Apr. 3, 1998

(51) Int. Cl.[7] .................................................. G06F 17/30
(52) U.S. Cl. ..................... 707/3; 707/2; 707/4; 707/5; 705/35; 705/8; 706/45
(58) Field of Search ......................... 707/3, 2, 5, 4; 706/45; 705/35, 8

(56) References Cited

U.S. PATENT DOCUMENTS

| | | | |
|---|---|---|---|
| 5,442,778 | * | 8/1995 | Pedersen et al. .......................... 707/5 |
| 5,483,650 | * | 1/1996 | Pedersen et al. .......................... 707/2 |
| 5,598,557 | * | 1/1997 | Doner et al. ............................. 707/5 |
| 5,694,523 | * | 12/1997 | Wical ..................................... 706/45 |
| 5,724,567 | * | 3/1998 | Rose et al. ............................... 707/2 |
| 5,754,938 | * | 5/1998 | Herz et al. .............................. 455/4.2 |
| 5,787,417 | * | 7/1998 | Hargrove ................................ 707/4 |
| 5,787,422 | * | 7/1999 | Tukey et al. ............................. 707/5 |
| 5,819,258 | * | 10/1998 | Vaithyanathan et al. ................ 707/2 |
| 5,940,821 | * | 8/1999 | Wical ..................................... 707/3 |

OTHER PUBLICATIONS

Verity, Incorporated, "Introduction to topic Guide V.2.0" chapter 1–5, Sep. 1996.*

* cited by examiner

Primary Examiner—Hosain T. Alam
Assistant Examiner—Jean M. Corrielus
(74) Attorney, Agent, or Firm—Fenwick & West, LLP

(57) ABSTRACT

An information system and method provide organizational and navigational aids to a user to facilitate exploration and analysis of a document collection. The system includes a document collection containing a plurality of documents, and a knowledge base containing a plurality of topics. Each topic expresses an idea or concept, and is associated with a set of terms which describe the topic, a set of documents in the document collection which are about the topic. Each topic also has topic-subtopic relationships with selected other topics, forming local topic hierarchies. A query analysis module receives a current query and processes the query against the document collection to select a set of documents that satisfy the query. A dynamic content organization module processes the document set according to defined parameters and a user selection or automatic selection of a desired topic arrangement to create various types of topic arrangements. These topic arrangements include supertopics, subtopics, perspective topic, and theme topic arrangements. A supertopic arrangement is a set of parent topics of a topic derived from the query, which parent topics best generalize the document set. A subtopic arrangement is a set of subtopics of a topic derived from the query which best cover and partition the document set. A perspective topic arrangement has perspective topics, each of is a parent topic of a set of subtopics that cover and partition the document set. A theme topic arrangement has theme topics, each of which expresses a major subject or concept that describes the document set and distinguishes it from the rest of the document collection.

36 Claims, 14 Drawing Sheets

DYNAMIC CONTENT ORGANIZATION IN INFORMATION RETRIEVAL SYSTEMS

BACKGROUND

1. Field of Invention

The present invention relates generally to information retrieval systems and methods, and more particularly, to the dynamic organization of content retrieved in response to user input queries.

2. Background of the Invention

Conventional information retrieval systems typically allow for one of two types of query paradigms, either topic navigation, or full text retrieval, or a limited combination of both. In a full text retrieval system, queries containing any keywords are processed to produce documents or other content which contains these keywords (or their synomyns, and other variants) or that otherwise best satisfy the query. Typically, the output content is organized in as a simple list, arranged either alphabetically, chronologically, or both some other sort criteria. These types of information retrieval systems are common in every type of information domain, such as document management systems, library catalogs, search engines for the World Wide Web, relational databases, and the like.

The problem with this type of query and retrieval paradigm is that it fails to provide to the user a useful arrangement of the returned set of documents and content in terms of the meaning or nature of the content itself. More particularly, it fails to organize the content according to a set of topics pertinent to the returned content. The lack of a topic organization makes it difficult for the user to evaluate the overall query results, and to further navigate or explore the search results for content of interest. This problem is especially significant when dealing with novice or casual users of an information database. These users are unlikely to specify their queries with a high degree of precision, and are also unlikely to know the range and variety of different types of documents available in the database. The absence of a topic arrangement of query results makes it difficult for such users to explore both the documents that satisfy the query, and other documents which may be of interest but which did not satisfy the original query. At best, full text systems allows the user to refine or generalize the query by conjoining or disjoining additional keywords to the original query. However, the problem remains that the resulting documents will have no topic arrangement.

To overcome these types of problems, topic based query systems have been employed. In a topic system, a collection of documents is organized under a hierarchy of topics and subtopics. Each topic is associated with a number of documents that are about that topic. The user navigates the topic hierarchy in a strictly linear fashion from topic to subtopic. When a topic of interest is found, the user can review the documents associated with that topic.

The problem with this type of information retrieval system is that the selection of topics is unlikely to include topics that match every users' potential interests. In particular, users often search for documents that satisfy two or more unrelated concepts which have no equivalent topic in the topic hierarchy. For example, a general purpose document collection may contain groups of topics such as:

| Topic | Subtopics . . . |
|---|---|
| Art | |
| | American |
| | Ancient Art |
| | Asian |
| | . . . |
| | Museums |
| | America |
| | Asia |
| | Europe |
| | Louvre |
| | . . . |
| and | |
| Animals | |
| | Mammals |
| | Insects |
| | Reptiles |
| | Crocodiles |
| | Frogs |
| | Snakes |
| | . . . |

Each of these topics would be is associated with its own set of documents, which may or may not overlap with the documents associated with other topics. The user is typically constrained to view documents under a single topic at a time. However, the user may have an interest in finding documents that are about both art museums and snakes. Since the topic hierarchy does not contain this precise intersection of topics, the user is unable to easily locate documents of interest, and must instead review all of the documents associated with "museums" and separately all of the documents associated with "snakes" to determine if any of them match this particular combination of topics.

One reason for this deficiency of conventional topic based systems is that the user is unable to specify a query which is the intersection of multiple topics in the topic hierarchy. For a topic hierarchy containing N topics, the possible number of topic intersections is N!. Since the more useful topic hierarchies will have hundreds or thousands of topics, it is computationally infeasible to determine a priori every possible topic intersection to determine which documents are associated each intersection.

Other systems provide a combination of topic and full text retrieval. In these systems, a full text query is processed to identify various topics in the topic hierarchy that match the query, or portions of it, and these topics and their documents are displayed to the user. However, if the located topics are not actually what the user is interested in, then a new query must be specified, and the process repeated. The user has no ability to modify the topics of the query directly to obtain a more refined intersection of topics, again due to the problem of the large number of topic intersections.

Accordingly, it is desirable to provide a system and method of query analysis and information retrieval that dynamically generates a topic organization of the content located in response to a user query, allowing for navigation and exploration of that content. Further, it is desirable to provide a system that offers the flexibility of full text retrieval in its ability to generalize and refine a search, and the organizational benefits of navigation and querying in a topic hierarchy.

SUMMARY OF THE INVENTION

The present invention overcomes the limitations of conventional information retrieval systems and methods by combining the refinement and generalization capabilities of a full text retrieval system with navigational benefits of a topic hierarchy. In particular, the present invention allows for conceptual navigation through a topic hierarchy using arbitrarily complex queries topic intersections, and by allowing the user to iteratively modify the topics or keywords used to query the topic hierarchy. The present invention further provides a variety of different topic arrangements and organizes the content resulting from a current query into different topic arrangements, and which enable the user to easily explore the content of a document collection using concepts and ideas, and not merely keywords.

In one aspect, an information retrieval system and method in accordance with the present invention operates upon a document collection of documents of any type, including include text, graphics, video, audio, multimedia and any other form of computer readable information. Each document is associated with one or more topics. The topics have arbitrary semantic relationships with one another, particularly including topic-subtopic relationships, where a subtopic is a semantic refinement of a topic. The information retrieval system receives a current query including various query terms. The current query may be an actual query input by a user, or a modification or expansion of a user query. The query terms may be any keywords including topic terms.

The current query is processed to select a set of an initial set documents from the entirety of the document collection. In accordance with the present invention, the information retrieval system organizes the set of documents according to the various topics associated with the documents contained therein into a dynamically created topic arrangement of topics and related subtopics. The topic arrangement generally organizes the documents in the set by selecting a set of topics and/or related subtopics that can be used to either refine (narrow) or generalize (broaden) the user's query. These topic arrangements are dynamically created by selection of specific topics from the topic hierarchy that optimally satisfy various criteria as to the quality of their ability to refine, generalize, cover, or distinguish the documents in the document set with respect to other documents in the document collection. The process of creating the topic arrangements may be automatically initiated or initiated by a user. The selection of which topic arrangement to create is preferably indicated by the user, and is responsive to a user selection of a topic derived from the query.

More particularly, the present invention provides four types of topic arrangements, supertopics, subtopics, perspective topics, and theme topics.

A supertopic arrangement is a selection of the parent or grandparent topics of the topics of the current query which best generalize the document set resulting from the current query. It is important to note that because a topic in the topic hierarchy can have a large number of parent topics, and a query can comprise multiple topics, the selection of every parent and grandparent topic of every query term is impractical, again due to the problem of the vast number of topic intersections. Thus, a supertopic arrangement selects the parent topics from among all of the possible combinations of parent topics the best generalize the current query, and thereby expands the document set to include additional documents. A supertopic arrangement has topics that are associated with all of the documents of the current document set. In addition, a supertopic arrangement may compress the topic hierarchy by excluding intermediate parent topics, and selecting the highest level parent topics that best generalize the document set.

A subtopic arrangement is the converse of the supertopic arrangement, and is a selection of those child or grandchildren topics of the topics associated with the current document set that together provide the best coverage of, and distinction (partitioning) over the current document set returned from the query. Like a supertopic arrangement, a subtopic arrangement will compress the topic hierarchy by excluding intermediate child topics, and selecting the lowest level child topics that best cover and partition the current document set.

Both supertopics and subtopics provide the user with an indication of which topics may be successfully added to the current query to produce useful results. This enables the user to navigate the topic hierarchy and document collection in a continuously interactive manner by selecting subtopics or supertopics, continuously refining and broadening the current query, instead of having to haphazardly attempt different keywords as in a full text system, or merely navigate through a strict linear topic hierarchy as in conventional topic based systems. Finally, supertopics and subtopics allows the user to specify as query on the document collection any arbitrary intersection of topics in the topic hierarchy, without the topic hierarchy having to be pre-structured with every possible topic intersection.

The ability to create supertopic and subtopic arrangements leads to the creation of two further types of topic arrangements, perspective topics and theme topics. A perspective topic arrangement includes a number of perspective topics. A perspective topic is a topic having subtopics that partition the document set resulting from the current query into a useful number and variety of subsets and that adequately cover the documents in the document set. Whereas a subtopic arrangement selects the subtopics of one of the query topics that best partition and cover the document set, a perspective topic is a topic other than the query topic that has subtopics that cover and partition the current document set. Thus, from the user's point of view, a perspective topic provides a good starting point for further navigating the document set using a perspective topic that was not in the query, refining the query by selecting various subtopics of the perspective topic. This is because the subtopics which partition the document set are always semantic refinements of the perspective topic, and thereby narrow the concept expressed by the perspective topic. Each subtopic of the perspective topic expresses a distinguishing concept or subject about its corresponding subset of documents, and all of the subtopics together provide coverage for at least a substantially majority (ideally all) of the documents in the document set. As a result, perspective topics provide the benefit that the resulting subtopics of each perspective topics are best suited to further navigate the document set of the user's query. Preferably, the information retrieval system generates about three to seven perspective topics, thereby providing a number of different perspectives on how the document set may be organized for further exploration and navigation.

Perspective topics also provide the benefit of grouping together semantically related sets of subtopics, thus helping to organize the set of all possible topics which could be used to divide the document set of the current query.

Preferably, the number of subtopics into which a perspective topic partitions the document set approaches a predetermined ideal number of subtopics. Also, it is preferable that the number of subtopics does not exceed a predetermined maximum number of subtopics.

Finally, successive additions of perspective topics to a query result in the accumulation of a context, in which previous query constraints are maintained while new query constraints are added. Again, this allows the user to explore the intersections of topics in the topic hierarchy without requiring the pre-structuring the topic hierarchy and document collection to account for all possible topic intersections.

A theme topic arrangement includes a number of theme topics. A theme topic is a topic that has a high frequency of occurrence in the document set resulting from the current query relative to its frequency of occurrence in the entire document collection. A theme topic thereby expresses a subject or concept that both describes the document set and distinguishes it from the rest of the document collection. An ideal theme topic has the property that if presented as a query, would result in the exact same set of documents as the current query, and no other documents. Thus, theme topics provide the user with an understanding of what other concepts or topics also describe the current document set in addition to the topics or concepts expressed in the current query. In this sense, a theme topic summarizes the document set, telling the user what the document set is about. Theme topics also provide the benefit of serving as possible next queries for the user, having the property that each theme topic will result in a new document set that is strongly related to the current document set which captures the user's query interest. Thus, themes are a way of dynamically providing related topics of interest, customized to a user's query.

Additionally, it is preferable that the number of subtopics of a theme topic approaches a predetermined ideal number. Also, it is preferable that the number of subtopics of a theme topic does not exceed a predetermined maximum number. Finally, it also preferable that all of the documents in the document set resulting from the current query being associated with a theme topic.

Theme topics and perspective topics have interesting relationships to each other. First, given a current query, a topic may be both a theme topic and a perspective topic to the document set. This will be the case where the topic both partitions and covers the document set as a perspective topic, and also describes and distinguishes it as a theme topic. For example, assume a current query of "animals" that returned a document set containing documents about various breeds of dogs, there being no other documents about other types of animals in the document collection. Then the topic "dogs" would be a good theme topic, since it would also return the same document set, and it would be a good perspective topic since it subtopics would both partition (e.g. by breed) and cover (all documents are indeed about dogs) the document set.

In accordance with the present invention then, a method for navigating a document collection using topic-based queries includes methods for creating a supertopic, subtopic, perspective, and theme topic arrangements, and allowing the user to modify and create queries by selection of displayed topics, or by direct entry of a keyword or topic word. In either case, the selected or entered topic modifies the query, preferably by substituting the selected or entered topic for a topic of the query. This modified query is then processed and a new set of documents satisfying the query is obtained.

More particularly, a method for navigating a document collection includes obtaining a document set that best satisfies a current query on the document collection, and determining from the set of documents, a set of topics associated with the documents, where each topic in the topic set is associated with at least one document in the document set. A user selection of one of the topics in the topic set is received and used to modify the query, which is then processed to select another set of documents that satisfy the modified query. The selected topic and its subtopics (and/or documents) is displayed to the user.

The set of topics that is provided to the user may include supertopics, subtopics, perspective topics, or theme topics. User selection of a supertopic generalizes the query to broaden the set of documents the satisfy the query, and yet retain the documents that satisfied the original query as the intersection of the original query topics. User selection of a subtopic refines the query to narrow the set of documents that satisfy the query. Similarly, user selection of a subtopic of a perspective topic creates a query which is the intersection of the original query topics and the subtopic of the perspective topic. User selection of a theme topic creates a new query which selects a document set that closely matches the original document set, but may contain additional or fewer documents, and is organized by its own distinct set of subtopics.

In accord with the present invention, a method of creating a supertopic arrangement of supertopics includes receiving a user selection of a topic in the set of topics resulting from the current query. All of the parent and grandparent topics of the selected topic are added to a set of candidate supertopics. From this candidate set, each possible supertopic combination (intersection of topics) is rated according to various criteria which describe how well the supertopic combination generalizes the current document set. Preferably, each supertopic combination is rated as a function of an ideal number of topics in a supertopic combination, and an ideal number of documents associated with more than one topic in the supertopic combination. Additionally, the rating of a supertopic combination may be a function of a maximum number of topics in the combination, such that a supertopic combination having more than the maximum number of topics therein is not selected as the supertopic arrangement. The most favorably rated supertopic combination is selected as the supertopic arrangement for the selected topic, and is displayed to the user.

A method of creating a subtopic arrangement includes receiving a user selection of a topic in the set of topics resulting from the current query. All of the child and grandchild topics of the selected topic are added to a set of candidate subtopics. From this candidate set, each possible subtopic combination is rated according to various criteria which describe how well the subtopic combination covers and distinguishes the current document set. Preferably, each subtopic combination is rated as a function of ideal and maximum numbers of topics in a subtopic combination, and an ideal number of documents associated with more than one topic in the subtopic combination. The most favorably rated subtopic combination is selected as the subtopic arrangement for the selected topic, and is displayed to the user.

In further accord with the present invention, perspective topics are selected by application of the subtopic arrangement process to each of a number of candidate topics. The candidate topics are accumulated as all of the topics (including child and grandchild topics) associated with the documents in the current document set. Each of these candidate topics is evaluated using the subtopic arrangement process, thereby selecting as perspective topics, parent topics whose children best cover and distinguish the current document set. Thus, for each candidate topic, each combination of its subtopics is rated, and this rating taken as the rating of the candidate topic with the particular subset of its subtopics in the rated subtopic combination. A number of the most favorably rated candidate topics are selected as perspective topics.

Also, in accordance with the present invention then, a method for creating a theme topic arrangement includes processing a current query to select a topicly unorganized first set of documents, and determining from the first set of documents a number of topics, each of which is associated with at least one document in the first set of documents. From these topics at least one topic is selected, where the selected topic is associated with a second set of documents that is substantially similar to the first set of documents resulting from the current query. The selected topics are displayed to the user.

In a preferred embodiment, in selecting the topics associated with a second set of documents substantially similar to the first set of documents, topics having a frequency of occurrence in the first set of document that is higher than the frequency of occurrence of the topic in the entirety of the document collection are preferably selected.

An information retrieval system in accordance with the present invention includes a document collection having a plurality of documents, each document associated with at least one topic, and a knowledge base of topics that defines topic-subtopic relationships between various topics. A strict linear hierarchy of all of the topics in the knowledge base is not required, and many unrelated smaller topic hierarchies or graphs may be used. A query analysis module receives a current query and processes the current query against a document collection to select set of documents from the document collection that satisfy the query. A dynamic content module determines automatically or in response to user selection generates supertopic, subtopic, perspective, and theme topic arrangements.

DETAILED DESCRIPTION OF THE PREFERRED EMBODIMENT

System Overview

Figure 1:
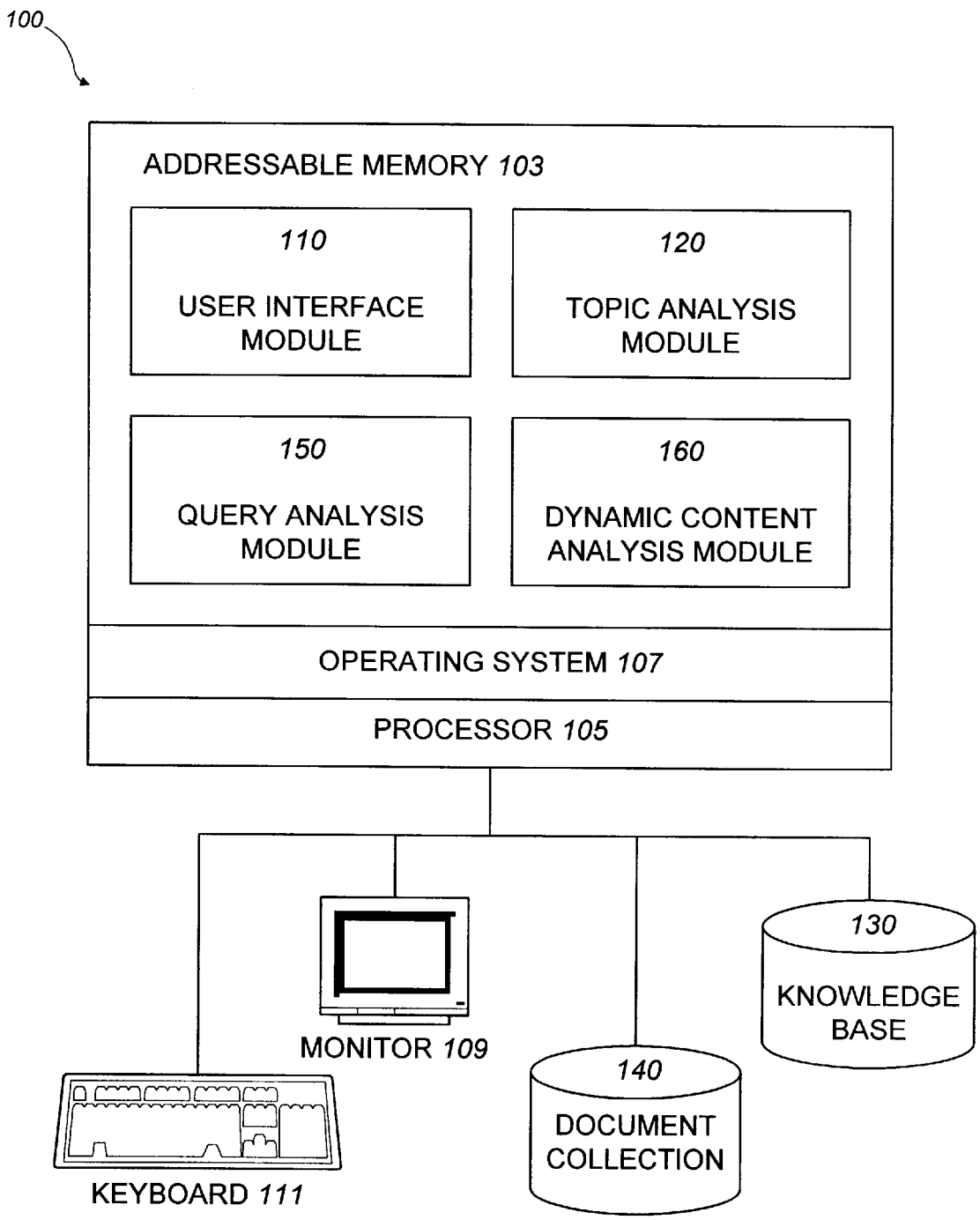
FIG. 1 is an illustration of an information retrieval system in accordance with the present invention.

Referring now to FIG. 1 there is shown an illustration of the software architecture of an information retrieval system 100 in accordance with the present invention. The information retrieval system 100 includes various functional software modules and structures that execute on a conventional computer system. The computer system includes including a processor 105, addressable memory 103, operating system 107, display device 109, and user input device, such as a keyboard 111 or a mouse.

Referring to the figure, the information retrieval system 100 includes a user interface module 110, a topic analysis module 120, a query analysis module 150, a knowledge base 130, a document collection 140, and a dynamic content organization module 160. These software modules and structures configure and control the computer system to operate in accordance with the present invention.

The user interface module 110 is responsible for providing a user interface to the information retrieval system 100 including receiving user input queries and displaying query results, including a resulting topic arrangement 162 of topics and documents resulting from the processing and analysis of a current query on the display device 109 of the computer system.

The knowledge base 130 is a persistent data store that system 100 uses to store topic information. The knowledge base 130 comprises arbitrary number of topics. Each topic has one or more terms that are synonyms for each other. A term is a word or series of words (e.g., a noun phrase) that refer to a topic. A topic describes a possible subject annotation for documents in the document collection 140. An implementation of the knowledge base 130 may store the topics and terms in a topic-term table with the following structure for each entry: {Topic, TermList}, where TermList is a list of terms. Each topic in the knowledge base 130 may have a unique topic ID code for cross-referencing in other tables.

The knowledge base 130 contains a number of topics linked together in a hierarchical interconnected graph by relations. A topic may have any number of relationships to other topics, each relationship having a predefined type. For purposes of the present invention, the relationships of interest are parent and child relationships that define the semantic relationships of topic-to-subtopic. A topic is a subtopic of another topic if it defines a semantically narrower concept than the other topic. A child topic relationship may be understood as a "type-of" or "is-a" relation, and a parent relationship is the reciprocal of this. For example, "Siberian Husky" is a subtopic of the topic "dog," which itself is a subtopic of the topic "mammal." In the knowledge base 130 then "Siberian Husky" would have a child topic relationship to "dog" and "dog" would have a parent topic relationship with "Siberian Husky." Generally, it is necessary to explicitly store only one relationship, with the other being implicit and treated as though it is specified.

The knowledge base 130 can have any number of topic-subtopic hierarchies, which may be independent of each, or which share one or more topics, or both. An implementation of the knowledge base 130 may store the topic-subtopic relationships in a topic relationship table with the following structure for each entry: {Topic, Topic, Relationship}. The system administrator creates and administer the knowledge base 130 off-line.

The document collection 140 is a set of documents. Each document contains any variety of content, including text, graphics, audio, video, multimedia, or any combination of media data types. A document also has meta-data which classify the document. The meta-data may include items such as document identifier, title, author, date, publication, industry codes, and the like. Preferably, these items of meta-data may themselves be references to topics in the knowledge base 130, so that they may be used by the dynamic content organization module 160 to create various topic arrangements.

Thus, dynamic content organization module 160 need not only perform its operations on the "subject" type annotations of documents, but also on "file" type annotations, such as "author" or "journal."

In addition, each document has an association with at least one topic in the knowledge base 130, and preferably with many topics. For example, a document about training Siberian Husky dogs for the Iditarod sled race may have associations with topics such as "Siberian Husky," "Dog," "Sled Racing," "Alaska," "Iditarod," "Endurance Sports," and the like. An implementation of the document collection 140 may store the document-topic associations in a document-topic table with the following structure for each entry: {Document, TopicList}, where TopicList is a list of topics. Thus, a document may have associations with any number of topics, and a topic may have associations with any number of documents.

During analysis of documents in accordance with the present invention, if a document has an association with a topic in the document collection 140, the document is assumed to be associated with each parent topic of that topic.

The document collection 140 may also contain a complete index of all terms in all documents for use in query analysis.

System Operation

Figure 2:
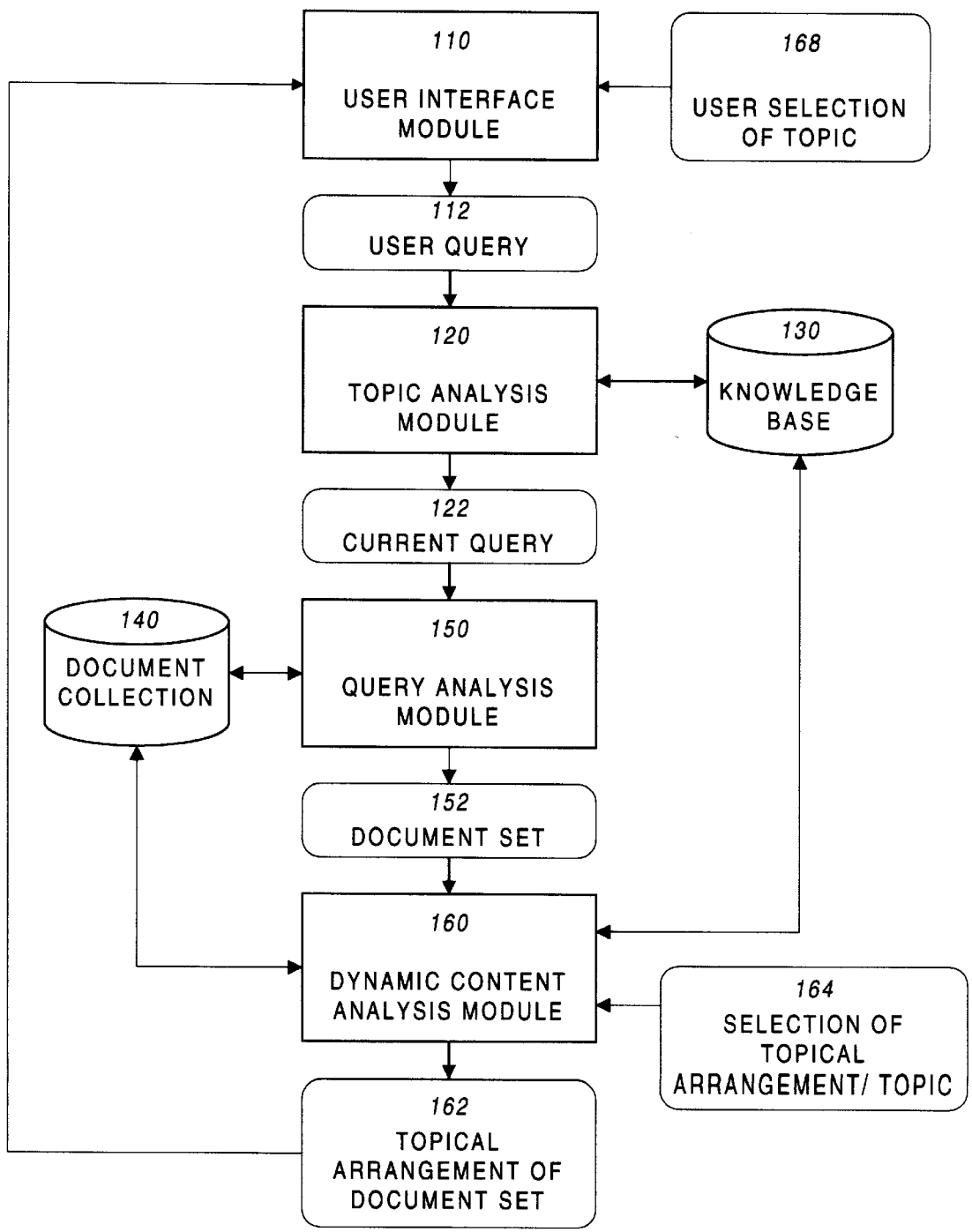
FIG. 2 is an illustration of the operation of the information retrieval system in accordance with the present invention.

Referring now to FIG. 2, the preferred operation of the information retrieval system 100 is generally as follows. The user interface module 110 receives a user query 112. This may be keyboard input, or selection of keywords or symbols on the display device 109 with a pointing device, or by any other mechanism. The user query 112 will typically comprise a number of terms which may or may not correspond identically with topics of the knowledge base 130. The user query may contain Boolean or other types of search operators, such as proximity operators.

In a preferred embodiment, the user interface module 110 provides the user query 112 to the topic analysis module 120. The topic analysis module 120 maps the user query 112 onto the topic or topics which are associated with the query terms in the knowledge base 130 to create a current query 122. The current query 122 may also contain various Boolean or other types of search operators. The current query 122 includes a list of topics that are associated with the query terms, and may contain the original query terms themselves. In one embodiment, the list of topics contains only topics that have direct associations with the query terms, e.g. there is specific {topic, query term} association in the topic-term table for the topic. In another more powerful embodiment, the list of topics for the current query 122 is expanded to include both topics which have direct associations with the query terms, as above, and topics that are parents of topics having direct associations with query terms. The topic analysis module 120 provides the current query 122 to the query analysis module 150.

The query analysis module 150 processes the current query 122 against the document collection 140 to obtain a set of documents 152 that satisfy the current query 122. Any variety of query analysis methods may be used to obtain a set of documents that satisfy the query. One implementation selects documents that have associations to at least one topic in the current query 122 as defined in the document collection 140. Full text retrieval may be used to select documents having terms which match one or more terms of the current query. The set of documents 152 may have a default topic organization or merely an indexed (e.g. alphabetical) organization.

In an alternative embodiment, the user interface module 110 may provide the user query 112 comprising a text string directly to the query analysis module 150, bypassing the topic expansion of the topic analysis module 120. The query analysis module 150 would then use the user query 112 as a full text current query 122 against a full-text index of the document collection 140 to select a set of documents 152. Similarly, a current query 122 may consist of other types of non-topic constraints, such as a traditional SQL query.

The query analysis module 150 preferably provides for multiple topic querying, in particular, query processing of queries having the form (T1 OPERATOR T2 . . . ) where T1 and T2 are topics in the knowledge base 130, and OPERATOR is a logical operator such as AND or OR. When the operator is AND, the query analysis module 150 obtains the subsets of documents associated with each topic T, and determines the document set 152 as the intersection of these subsets. When the operator is OR, the query analysis module 150 obtains the subsets of documents associated with each topic T, and determines the document set 152 as the union of these subsets. Other implementations of multiple topic querying may also be used so long as the resulting document set 152 contains documents associated with the topics in the query.

The query analysis module 150 provides the document set 152 to the dynamic content organization module 160 for analysis and creation of various topic arrangements 162 of the document set 152. The dynamic content organization module 160 creates these arrangements, either automatically or in response to user input 164 of a desired type of topic arrangement or one of the topics of the current query 122. The topic arrangements 162 are provided to the user interface module 110 which displays them on the display device 109, and allows the user to select 168 various topics in these arrangements as modifications to the user query for further exploration of the document collection 140.

The dynamic content organization module 160 creates four types of topic arrangements, supertopic arrangements, subtopic arrangements, perspective topic arrangements, and theme topic arrangements. The manner in which these arrangements are generated is further described below.

While the preferred embodiment employs its own query analysis module 150 provide the document set 152 to the dynamic content organization module 160, in other embodiments, the current query may be processed by separate querying system, even one that is remotely located to the dynamic content organization module 160. For example, the dynamic content organization module 160 may be provided to operate with an existing SQL type database and query engine, which receives and processes a user query against such database, and provides the resulting document set 152 to the dynamic content organization module 160. The only constraint is that the dynamic content organization module 160 be provided with a document set 152 resulting from the query, and have access to the knowledge base 130 of topics.

Supertopic and Subtopics Arrangements

A supertopic is a semantic generalization of a selected topic in the current query 122, and thus a supertopic arrangement is a set of supertopics which best generalizes the document set 152 of the current query 122. A subtopic is a semantic refinement of a selected topic in the current query 122, and thus a subtopic arrangement is a set of subtopics which best refines (covers and partitions) the document set 152. The number of subtopics or supertopics in their respective arrangements is controlled by parameters applied to the dynamic content organization module 160.

Figure 3:
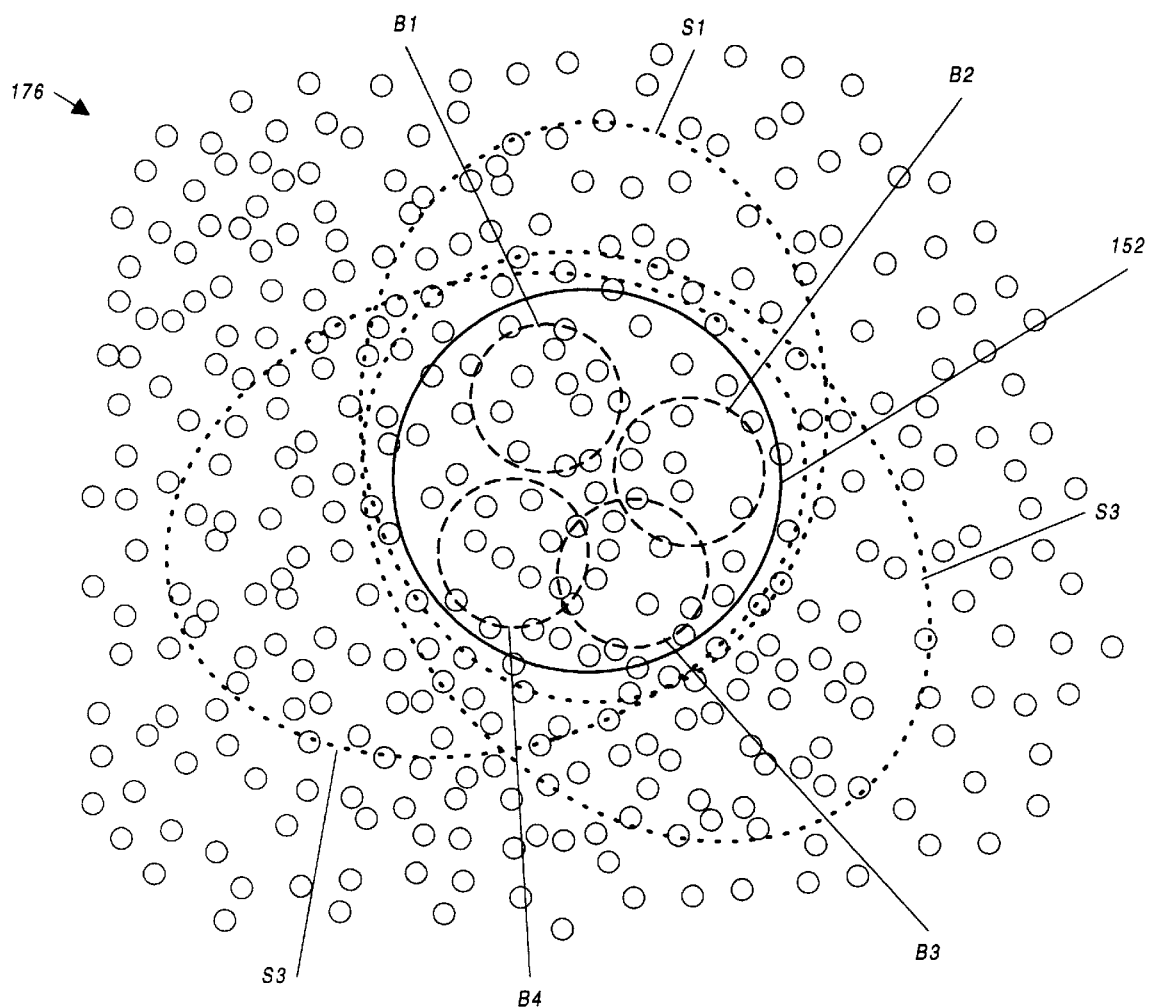
FIG. 3 is a Venn diagram illustration of supertopic and subtopics in accordance with the present invention.
Figure 4:
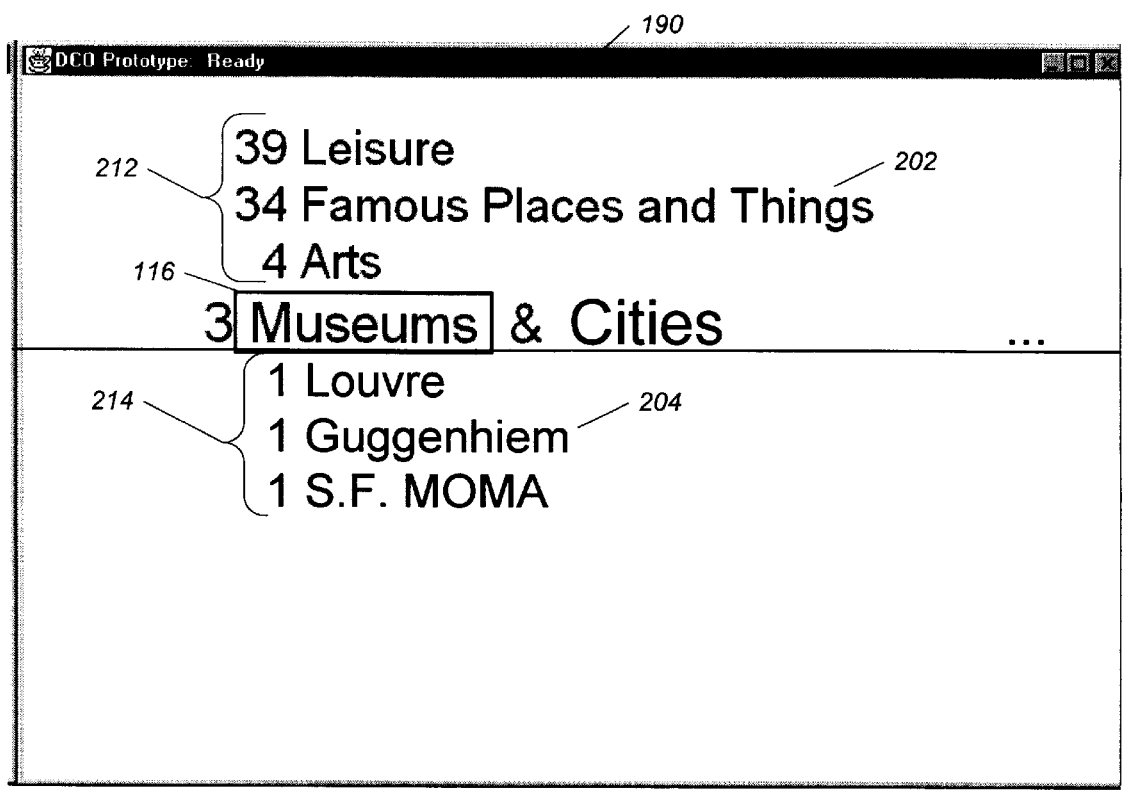
FIG. 4 is an illustration of a user interface for displaying supertopic and subtopic arrangements.

FIG. 3 provides a Venn diagram illustration of supertopics and subtopics in relationship to a current document set 152 and document collection 140. FIG. 4 illustrates an example of a user interface 190 for providing the supertopic and subtopic arrangements of a given set of query topics. In FIG. 3, there is illustrated a number of documents 176 in a document collection 140. A current query 122 including an arbitrary number of topics T=(T1 . . . Tn) has been applied to the document collection 140 and returns a set of documents 152 that are associated with these topics. In the example of FIG. 4, the topics T are "Museums" and "Cities". Formally, a supertopic arrangement is a set of supertopics S=(S1 . . . Sn) that best generalizes the documents in the current document set 152. Each supertopic S is associated a group of documents comprising 1) all documents in the current document set 152, and 2) an extension set of documents that does not include documents in the current document set 152. A good supertopic arrangement is one in which the various extension sets for the different supertopics have relatively little (if any) overlap, that is, documents associated with multiple supertopics.

FIG. 4 illustrates one way of displaying supertopic arrangement 212 to a user, as a listing of the supertopics 202 above a selected topic 116 in the query, here the topic "Museum." The supertopics 202 of the selected topic include "Famous Places and Things," "Leisure," and "Arts." These supertopics 202 are the topics that best generalize the document set 152 resulting from the query which intersects the topics "Museums" and "Cities."

A user may select a supertopic 202 to navigate through the topic hierarchy by creating a generalization of the current query. Assume a current query (T1 AND T2 AND . . . AND Tj) has been processed, a supertopic arrangement for topic Tj is displayed, including supertopics S1 . . . Sn. If a user selects a supertopic Si of topic Tj, then the effect is the creation of a modified query (T1 AND T2 AND . . . Si) where Si replaces Tj in the original query. The modified query is processed by the dynamic content organization module 160, which results in a new document set associated with all of these topics. A supertopic arrangement 212 thus provides the benefit that the current document set 152 resulting from the current query 122 can be broadened along specific topics of interest, without the user having to determine and enter a new query all over again. This enables the user to easily find additional documents when the initial query was too narrow.

Figure 5A:
FIGS. 5a–5d are illustration of the use of supertopic arrangements for navigation through a topic hierarchy.
Figure 5B:
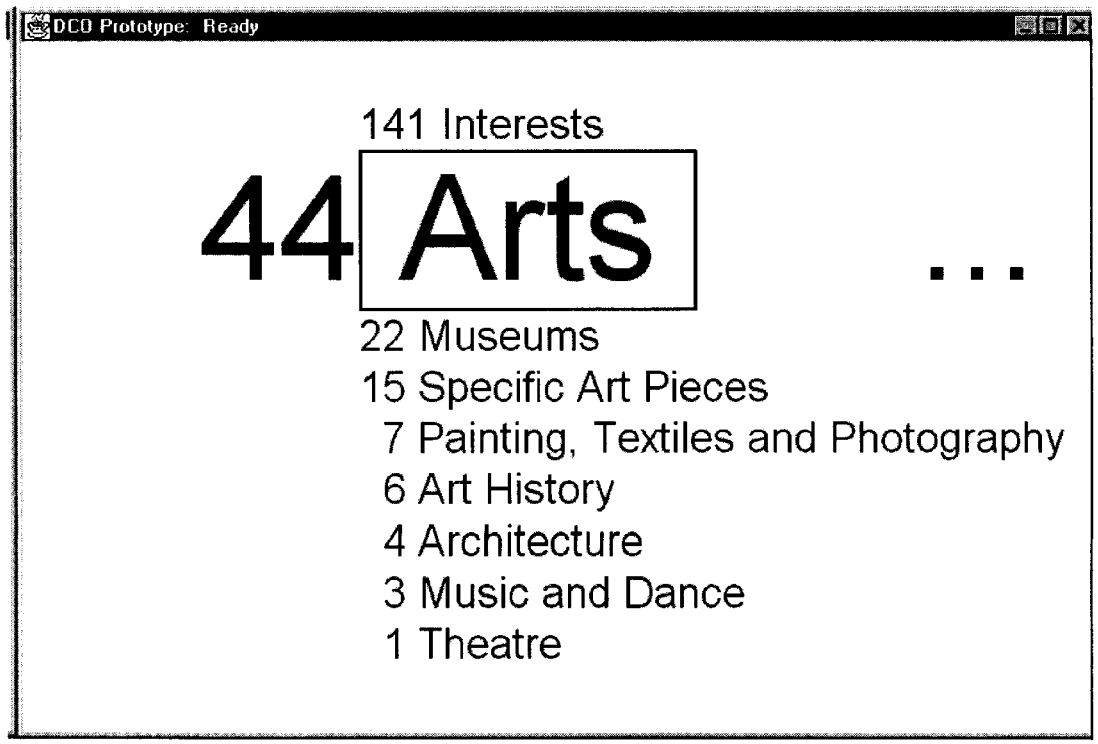
Figure 5C:
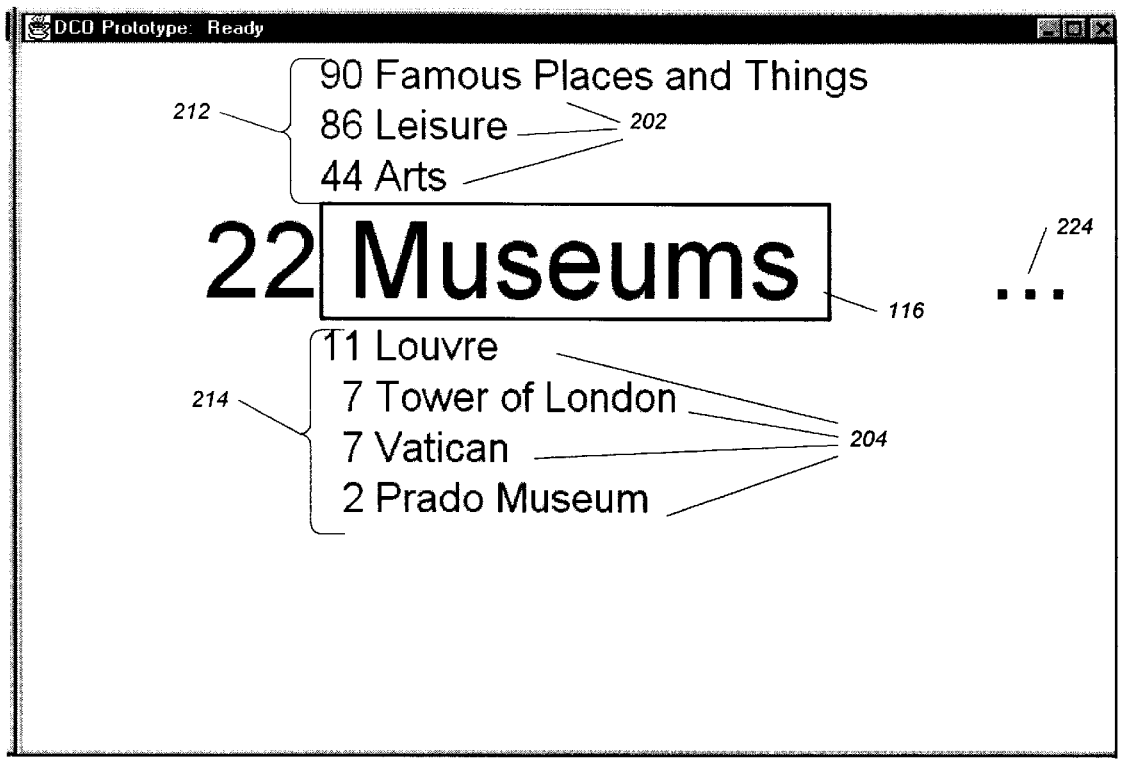
Figure 5D:
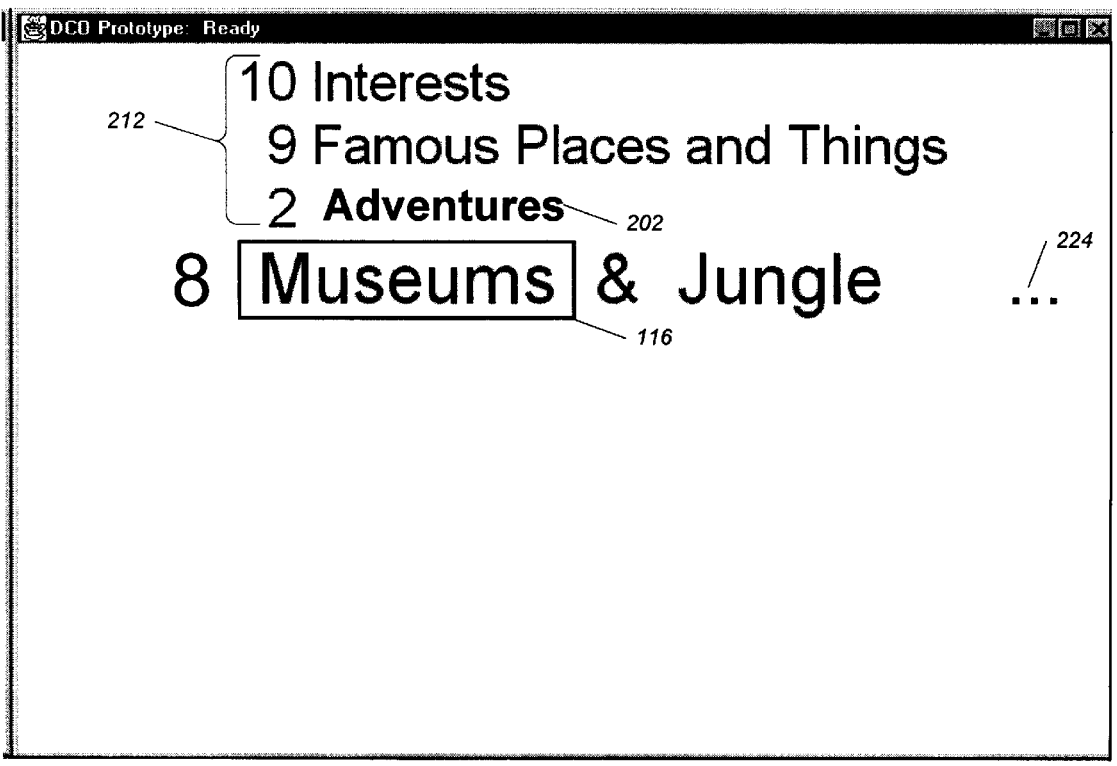

A supertopic arrangement 212 also allows for compression of the topic hierarchy so that only certain parent topics of the selected topic 116 are included, thereby demonstrating that only certain topic intersections of interest to the user are computed and displayed. FIGS. 5a and 5b illustrate navigation through the topic hierarchy. In FIG. 5a, the top level of the topic hierarchy includes the topic "Interests" which has 141 documents associated with it. The "Interests" topic has subtopics of "Arts," "History," "Eco Adventure," "Culinary," and "Business." The number of documents associated with each subtopic is indicated by the numeral to the left of the topic. In FIG. 5b, the "Arts" topic has been selected by the user, and its subtopics are shown, including "Museums," "Specific Art Pieces," "Painting, Textiles, and Photography," "Art History," "Architecture," "Music and Dance," and "Theatre." Referring to FIG. 5c, when the "Museum" topic 116 is selected, the dynamic content organization module 160 generates a new supertopic arrangement 212 appropriate to it. Note that this arrangement does not include the "Interests" topic, but rather includes topics such as "Famous Places and Things," "Leisure," and "Arts" as supertopics 202. This is because the supertopic arrangement 212 has been dynamically generated and includes these topics since they best generalize the documents associated with the "Museum" topic. The dynamic selection of supertopics is further illustrated in FIG. 5d. Here, the user has added a new keyword "Jungle" to the current query 122. This may be done, for example, by selection of the term addition icon 224 which invokes a text entry field for user input of a keyword or topic term. The addition of this term is a refinement of the query, since it narrows to the desired concept to documents that are about both museums and jungles. Processing of the query thus results in a different document set 152 with 8 documents that satisfy the query. Selection of the "Museum" topic by the user now results in a different supertopic arrangement with supertopics "Interests," "Famous Places and Things," and "Adventures." This time note the "Arts" topic has been excluded, even though it is a direct parent of the "Museums" topic. The new supertopic arrangement results from the fact that there is a different set of generalizations of the new document set due to the addition of the topic "Jungle" to the query.

A subtopic arrangement is a set of subtopics B of a selected query topic that best cover and partition the current document set 152. FIG. 4 also illustrates a subtopic arrangement 214 of subtopics 204 for the selected topic "Museum." More formally, each subtopic 204 in a subtopic arrangement is a refinement of the topics of the current query, and thus is associated with a subset of the current document set 152, and not any documents outside of the current document set. FIG. 4 illustrates one of way of displaying a subtopic arrangement 214 to a user, here as a listing of subtopics 204 below a selected query topic 116. The visual organization of FIGS. 4, 5a–5d is merely one of many different layouts that may be used to present the supertopic and subtopic arrangements to the user. Alternate layouts of these topic arrangement would include a simple outline-indented list. The particular manner in which these topic arrangements are displayed is not material to the invention.

The subtopics arrangements are likewise dynamically generated by the dynamic content organization module 160 in response to user inputs. Assume a current query (T1 AND T2 AND . . . AND Tj) has been processed, a subtopic arrangement for topic Tj is displayed, including subtopics B1 . . . Bn. If the user selects a subtopic Bi to view, then the effect is the creation of a modified query (T1 AND T2 AND . . . Bi), where Bi replaces Tj of the original query. The modified query is processed by the query analysis module 150, which results in a new document set including documents associated with all of these topics. A subtopic arrangement 214 provides the benefit that the current document set is organized into smaller subsets corresponding to the subtopics, enabling the user to easily refine the initial query. As with supertopics, additions of new terms to the current query will result in a different set of subtopics being generated for each of the query topics.

Perspective Topic Arrangements

A perspective topic may be understood as a parent topic of a set of subtopics in a subtopic arrangement, and thus a perspective topic arrangement is a set of such perspective topics. More particularly, a perspective topic is a topic that has subtopics that partition the document set resulting from the current query into a useful number and variety of subsets. The number and variety of subsets that is determined to be useful is controlled by a set of parameters to the dynamic content organization module 160. For a given perspective topic, all subtopics are semantically related to the perspective topic as child topics. "Semantically related" means that the subtopics are semantic refinements of the perspective topic in the knowledge base 130. A perspective topic arrangement preferably includes three to seven perspective topics.

Referring to FIGS. 6a–6d there is shown an example illustration of a perspective topic arrangement 302 in accordance with one embodiment of the present invention. In this example, the current query 122 is "Arts," as either directly entered by the user or created by the topic analysis module 120 from a user input query. Execution of the current query 122 on the document collection 140 produces a document set 152 of 44 documents that satisfy this query. Selection of the perspective topic icon 178 initiates generation of a perspective topic arrangement 302 including a number of perspective topics 304, each of which has a number of perspective subtopics 306. In a perspective topic arrangement 302, as with subtopic arrangements 212, within each perspective topic 304, the partitioning of the document set 152 amongst the perspective subtopics 306 does not result in mutually exclusive assignment of documents to subtopics 306. This is shown by in FIG. 6a for example, by the fact that while there are only 44 documents in the current document set, there are a total of 64 associations to the various perspective subtopics, indicating that several documents in the document set are associated with more than one perspective subtopic 306.

The visual organization of FIGS. 6a–6d is merely one of many different layouts that may be used to present the perspective topic arrangement 302 to the user. Alternate layouts of a perspective topic arrangement would include a simple outline-indented list. The particular manner in which a perspective topic arrangement is displayed is not material to the invention. The user may select any of the perspective subtopics 306 to view the list of documents associated with the selected subtopic.

In this example then, the various perspective topics 304 of "Europe," "Travel Mode," "Environment," "Preferred Social Group," and "Famous Places and Things" provide the user with a sense of the different ways in which the document set which satisfies the query of "Arts" can be broken down and organized for further inquiry. Each of these perspective topics 304 has a different set of subtopics 306 which variously partition and cover the 44 documents in the document set.

Figure 6A:
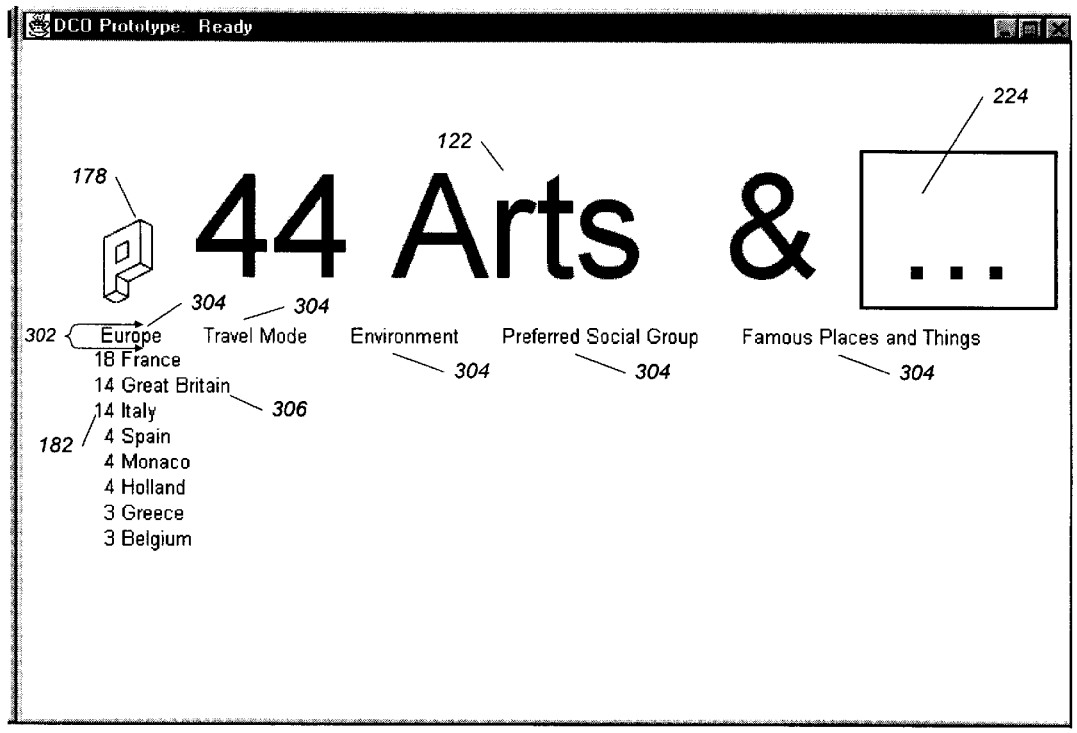
FIGS. 6a–6d are illustrations of a user interface for displaying perspective topics arrangements.
Figure 6B:
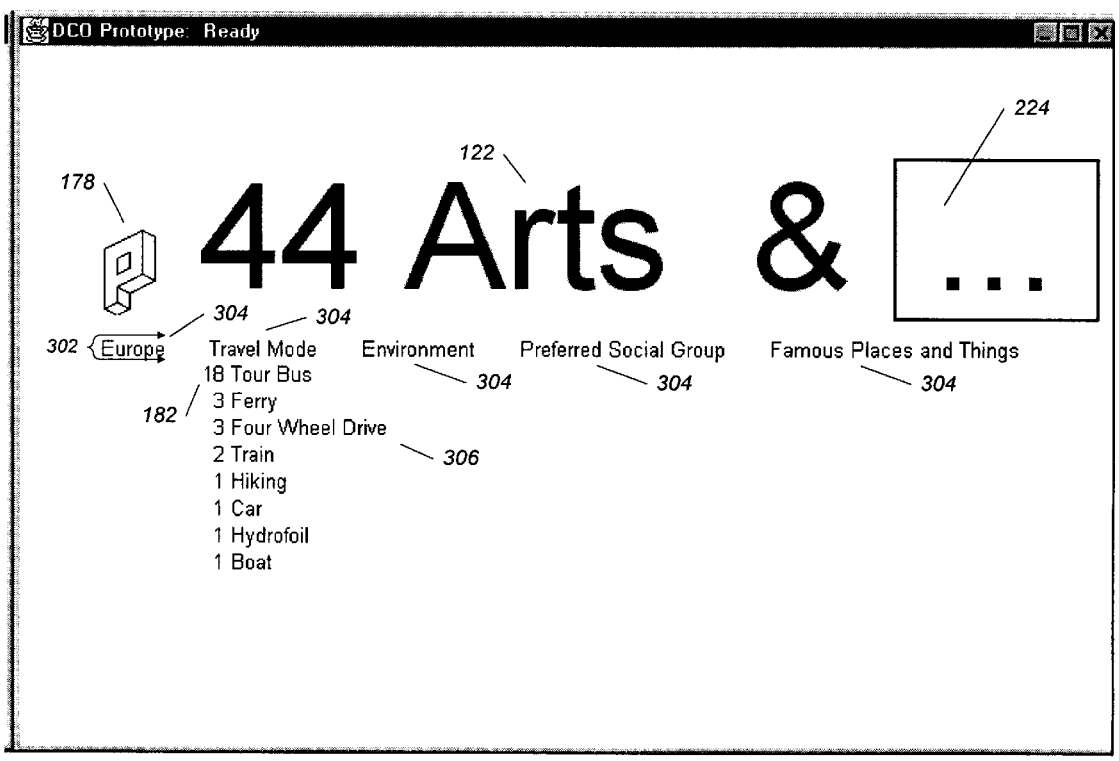
Figure 6C:
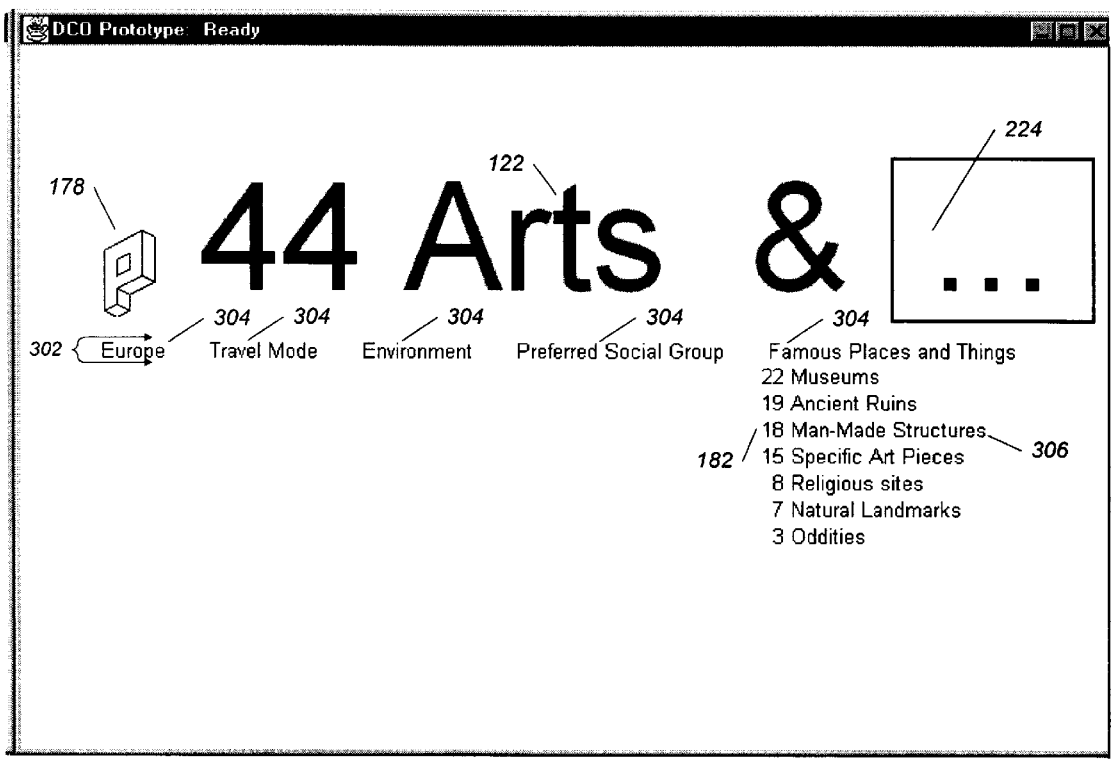
Figure 6D:
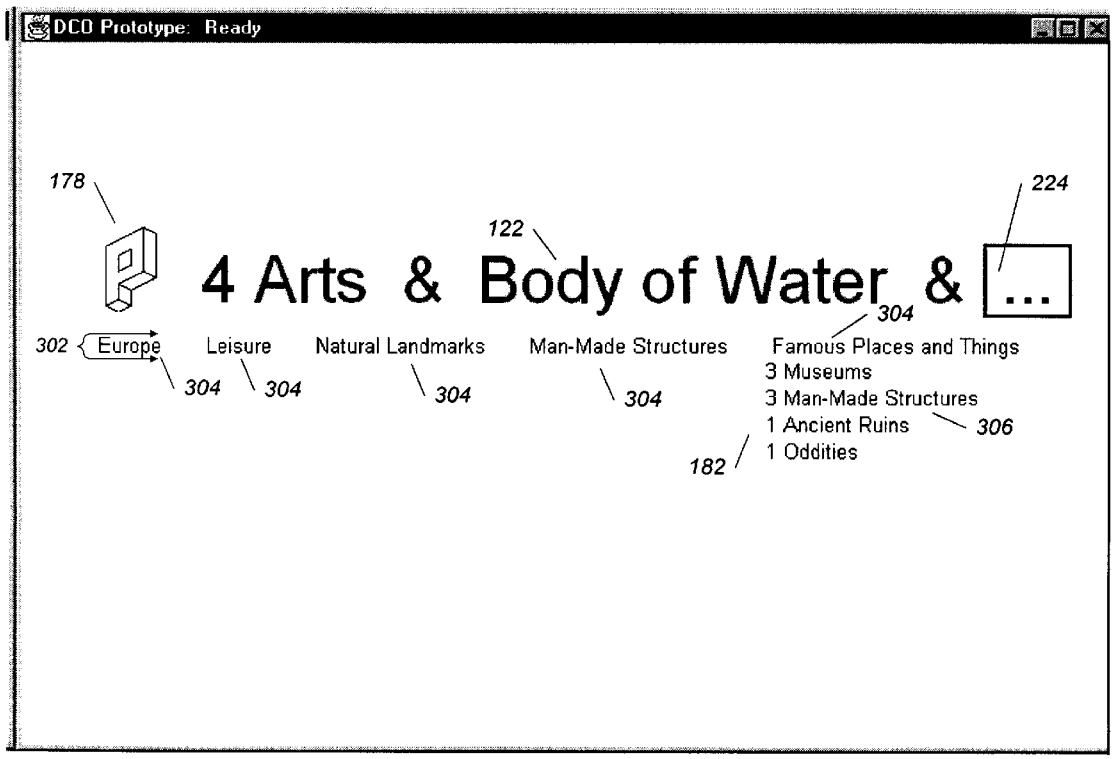

The selection of perspective topics and their subtopics is directly influenced by the topics included in the current query. FIG. 6c illustrates the perspective subtopics 306 of the perspective topic "Famous Places and Things" when the query is "Arts." However, modification of the query to include the topic "Bodies of Water" as in FIG. 6d results in a reduced document set (now 4 documents down from 44) and a much smaller and different set of perspective subtopics 306.

The listing of the number 182 of documents associated with perspective subtopic 306 is optional, and provides the user with additional information about the distribution of the document set across the various perspective subtopics 306. In this embodiment, it is preferable that the subtopics 306 be listed in order of decreasing number of documents associated with each subtopic.

Finally, as before, the perspective subtopics 306 provide for immediate refinement of the query to allow for continued exploration and navigation of the document set. Selection of a perspective subtopic 306 results in the refinement of the query as the intersection of the query with the selected perspective subtopic 306. For example, selection of the "France" subtopic 306 results in the query "Arts AND France" being processed against the document collection 140. Accordingly, the user is able to continually refine their searches by selection of perspective subtopics.

Theme Topic Arrangements

Themes are another topic arrangement provided by the dynamic content organization module 160. A theme topic is a topic, other than a topic in the current query, that specifically describes the current document set 152 and distinguishes it from the rest of the document collection 140. More particularly, a theme topic may be understood along two different dimensions. In one aspect, a theme topic is a topic that is associated with a higher percentage of the current document set 152 than would be expected based on its associations with documents in the entire document collection 140. For example, a topic that is associated with 90% of the document set 152 but only 5% of the document collection 140 would be good theme topic. In an embodiment of this approach a theme topic is a topic that has a high frequency of association with documents in the document set 152 resulting from the current query 122 relative to its frequency of association with the entire document collection 140. Thus, to the user a theme topic expresses a subject or concept that both describes the document set 152 and distinguishes it from the rest of the document collection 140. Another manner of expressing a theme topic is that a theme topic is a topic other than current query topics that is associated with substantially the same (ideally, identical) documents as the current document set resulting from the current query. The frequency of occurrence relationships described above will also be true in this case.

In another aspect, a theme topic is a topic that is associated with a high percentage of the document set 152. In this mode, a topic that is associated with 50% of the document set 152 is a better theme topic than a topic that is associated with only 5%. In an embodiment of this aspect, a theme topic is a topic that has a high frequency of association with the document set 152 relative to other potential theme topics.

Figure 7A:
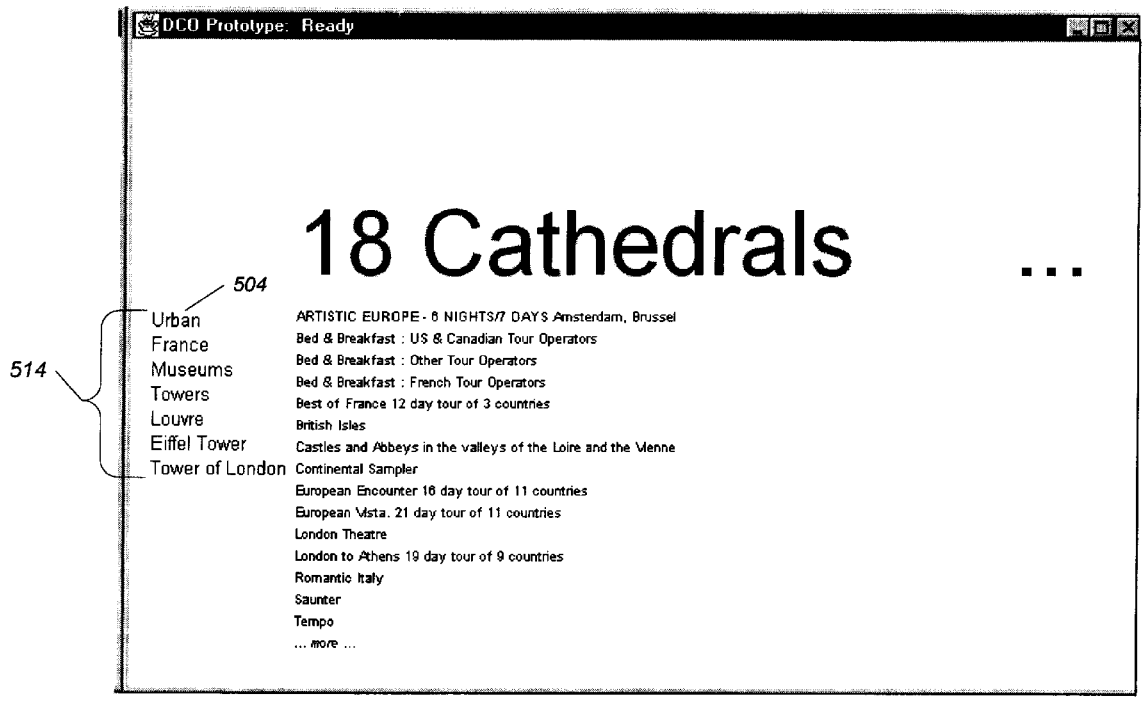
FIGS. 7a–7b are illustrations of a user interface for displaying theme topic arrangements.
Figure 7B:
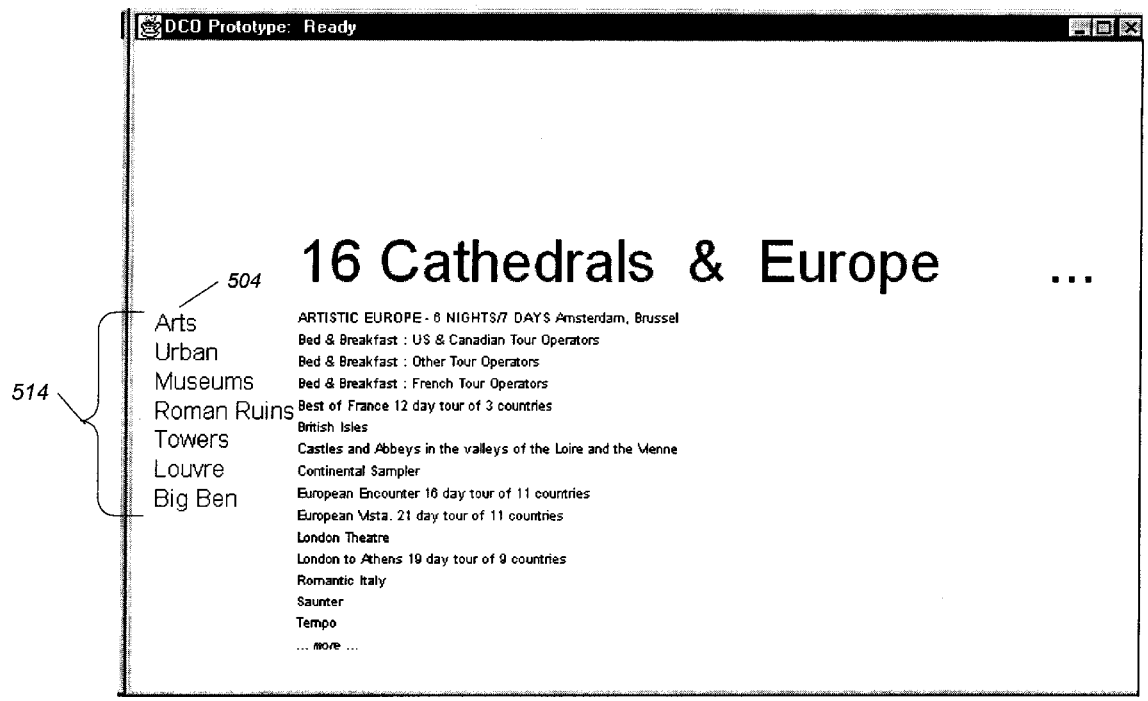

Referring to FIGS. 7a–7b there is shown an example illustration of a theme topic arrangement 514 provided by the user interface module 110 in accordance with one embodiment of the present invention. In this example, the current query 122 is "Cathedral," as either directly entered by the user or created by the topic analysis module 120 from a user input query, and produces a corresponding document set 152. A set of theme topics 504 is provided, in this example "Urban," "France," "Museums," "Towers," "Louvre", "Eiffel Tower," and "Tower of London." Each of these theme topics 504 is associated with a set of documents that is substantially similar to the document set associated with the query "Cathedral."

As with the other topic arrangements, theme topics are responsive to the current query as modified by the user. In FIG. 6b, the user has refined the query by addition of the topic term "Europe." The theme topics 504 generated in response to the new query are different, with the addition of theme topics "Arts," "Roman Ruins" and "Big Ben," and the exclusion of topics "Eiffel Tower," and "Tower of London."

Selection of a theme topic 504 enables the user to further explore the document collection 140, and identify additional documents or subjects of interest that may not have been known to the user. Thus, theme topics provide yet another mechanism for exploring the document collection 140 using concepts and not merely keywords as in conventional systems.

Theme topics are distinct from perspective topics, and each type provides the user with a different understanding and insight into the topical organization of the document set resulting from the current query. For example, assume that a current query is for documents satisfying the keyword "Islands" in a document collection 140 of documents about vacation packages. A set of theme topics for the document set may be: "Swimming", "Sailing", "Beaches", "Secluded Retreats", "Tropical", and "Ocean", as each of these themes would be associated with about the same set of documents as the document set.

In contrast, a set of perspective topics, and their subtopics for the same document set may be:

| Perspective Topic | Subtopic |
| --- | --- |
| Destinations | North America; South America; Europe |
| Accommodations | Hotels; Resorts; Camping |
| Preferred Social Group | Singles; Couples; Seniors; Kids |

The theme topics thus inform the user about other topics/concepts which also describe the current document set. The perspective topics and their subtopics inform the user of the concepts which best topically structure the document set for further navigation and analysis.

Generation of Supertopic Arrangements

Figure 8:
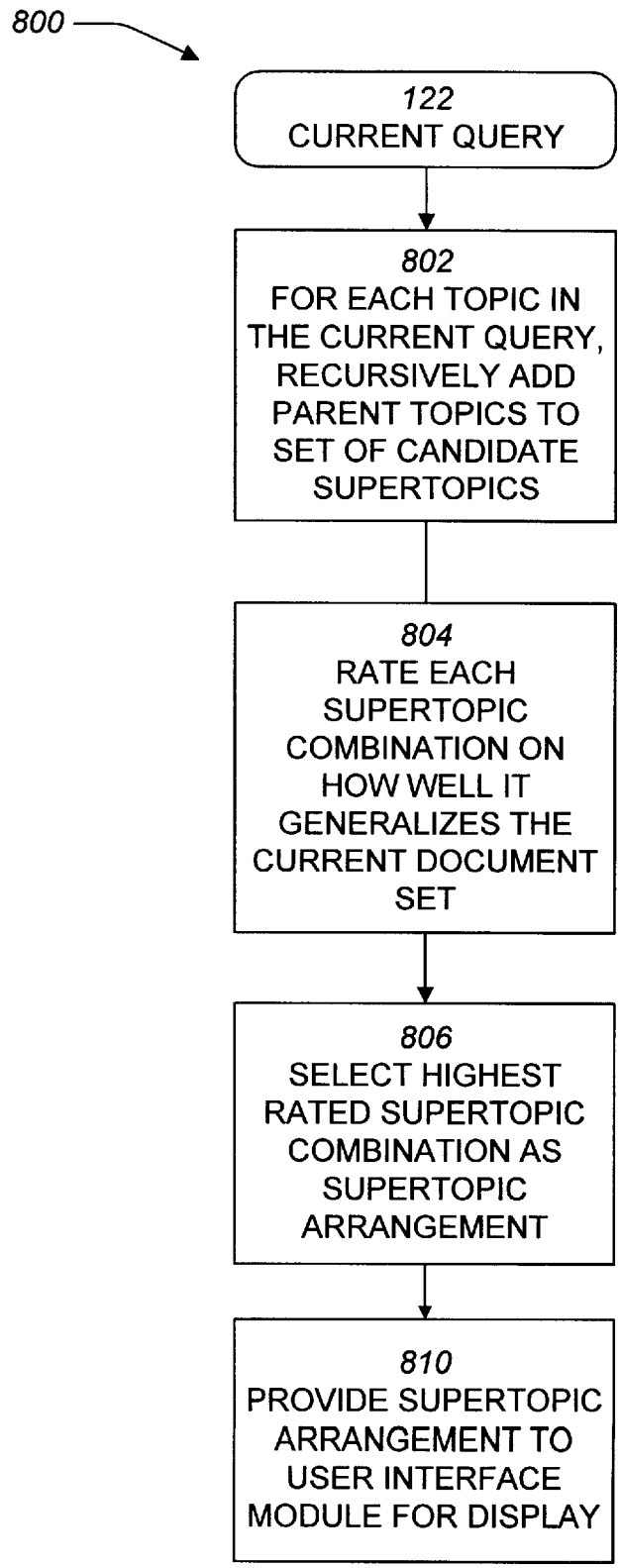
FIG. 8 is a flowgraph of the process of generating a supertopic arrangement.

Turning now to FIG. 8 there is shown a flowgraph of the operation of the dynamic content organization module 160 to generate a supertopic arrangement containing a number of supertopics in accordance with one embodiment of the present invention.

The input to the dynamic content organization module 160 is the current query 122; the dynamic content organization module 160 also has access to the knowledge base 130 to obtain topic data, including accessing parent and child topics of topics in the current query 122.

For each topic in the current query 122, the dynamic content organization module 160 adds 802 each of its parent topics in the knowledge base 130 to a set of candidate supertopics. This step is performed recursively until there are no more parents of candidate supertopics in the knowledge base 130 that are not already candidate supertopics. This process expands the candidate set to include all possibly relevant topics to current query to the candidate set. From this candidate set, a subset of supertopics will be selected as the supertopic arrangement.

For a candidate set of N supertopics, there are N! different combinations of supertopics that may be created. Each of a selected number of these supertopic combinations is rated 804 with respect to how well it generalizes the current document set 152. The rating determination is made with respect to a number of parameters expressed in rating logic or a rating equation of the dynamic content organization module 160. The parameters used by the dynamic content organization module 160 describe the number and coverage of the topics in a supertopic combination. The parameters used by the dynamic content organization module 160 are flexible, and are also used (with potentially different values) in rating subtopic, perspective topic, and theme topics combinations, as further described below.

Each parameter has a weight which describes the significance of the parameter in the rating scheme used by the dynamic content organization module 160. The weight thus serves as a mechanism for indicating which parameters are more important than others. The parameters and their weights may be adjusted by a system administrator to control the selection of a supertopic combination.

Table 1 describes the parameters used in a preferred embodiment of the rating scheme for rating supertopic combinations.

TABLE 1

Parameters for Rating SuperTopics

| Parameter | Example Value | Weight | Description |
| --- | --- | --- | --- |
| idealTopicCount | 7 | idealCountWeight | The ideal number of supertopics included in a supertopic combination. |
| maxTopicCount | 10 | maxTopicCountWeight | The maximum number of supertopics permissible for a supertopic combination. |
| idealOverlap | 0 | overlapWeight | The number of occurrences of documents in the document set associated with more than one supertopic in a supertopic combination. |

The Example Value column indicates an example value for a parameter. The Weight column gives the name of the weight applied to the parameter.

The idealTopicCount parameter defines an ideal number of supertopics in a supertopic combination. Supertopic combinations that have more or less than the ideal number of supertopics are less favorably rated than supertopic combinations having exactly the ideal number of supertopics.

The maxTopicCount defines a maximum number of supertopics in a supertopic combination. This parameter substantially reduces the number of supertopic combinations that need to be rated by the dynamic content organization module 160. For example, a maximum count of 10 supertopics means that at most 10! supertopic combinations have to be rated, even if the candidate set includes 100 supertopics, as any supertopic combination with more than 10 supertopics is skipped. Thus, this parameter helps overcome the problem of exponential topic intersections described above.

The idealOverlap parameter describes the number of documents of the document set 152 that may be associated with more than one topic in a supertopic combination. The idealOverlap parameter is preferably set to 0, meaning that it is ideal if each document in the document set 152 is associated with only a single supertopic of the supertopic combination being rated. However, in rating supertopic combinations, it is expected that there will be significant overlap between different supertopics (since all supertopics should ideally completely cover the document set 152), but the supertopic combination that has the least amount of overlap between its supertopics is still most favorable. This is because in this situation, such a supertopic combination will include the most additional documents outside of the current document set, and thus best generalize the current document set 152 with respect to the entire document collection 140.

Generally, the rating equation used by the dynamic content organization module 160 to rate a supertopic combination may be expressed as a weighted sum:

$$R_m = \sum_{i=1}^{p} S_i W_i$$

where Rm is the rating of supertopic combination m, Si is the score of parameter i (for i=1 to p parameters) for supertopic combination m and $W_i$ is the weight of parameter i. The score S is computed by a scoring function of the defined parameter value and the actual parameter value for the supertopic combination m. The scoring function may be a percentage variation, e.g., [defined value-actual value of m]/defined value] based on the actual value of the parameter for a candidate supertopic, a z-score, or the like.

For creating supertopic arrangements, a supertopic combination is favorably rated if it has close to the ideal number of supertopics, less than the maximum number of supertopics, all of the documents in the document set 152 are associated with at least one supertopic of the combination, and has a very low number of documents that are 1) not included in the document set 152, and 2) associated with more than one supertopic.

Referring again to FIG. 8, once the various supertopic combinations are rated according to the parameters, the dynamic content organization module 160 selects 408 the most favorably rated supertopic combination as the supertopic combination. A favorable rating value depends entirely on the mathematical implementation of the rating scheme, with some implementations making a high rating value favorable, while other implementations may make a low rating favorable; such implementation details are not material to the invention. As indicated in FIG. 2, the selected supertopics and their respective subtopic combinations are passed 810 to the user interface module 110 which displays them to the user, for example, in a layout like that illustrated in FIG. 3, or in some other useful format.

Generation of Subtopic Arrangements

Figure 9:
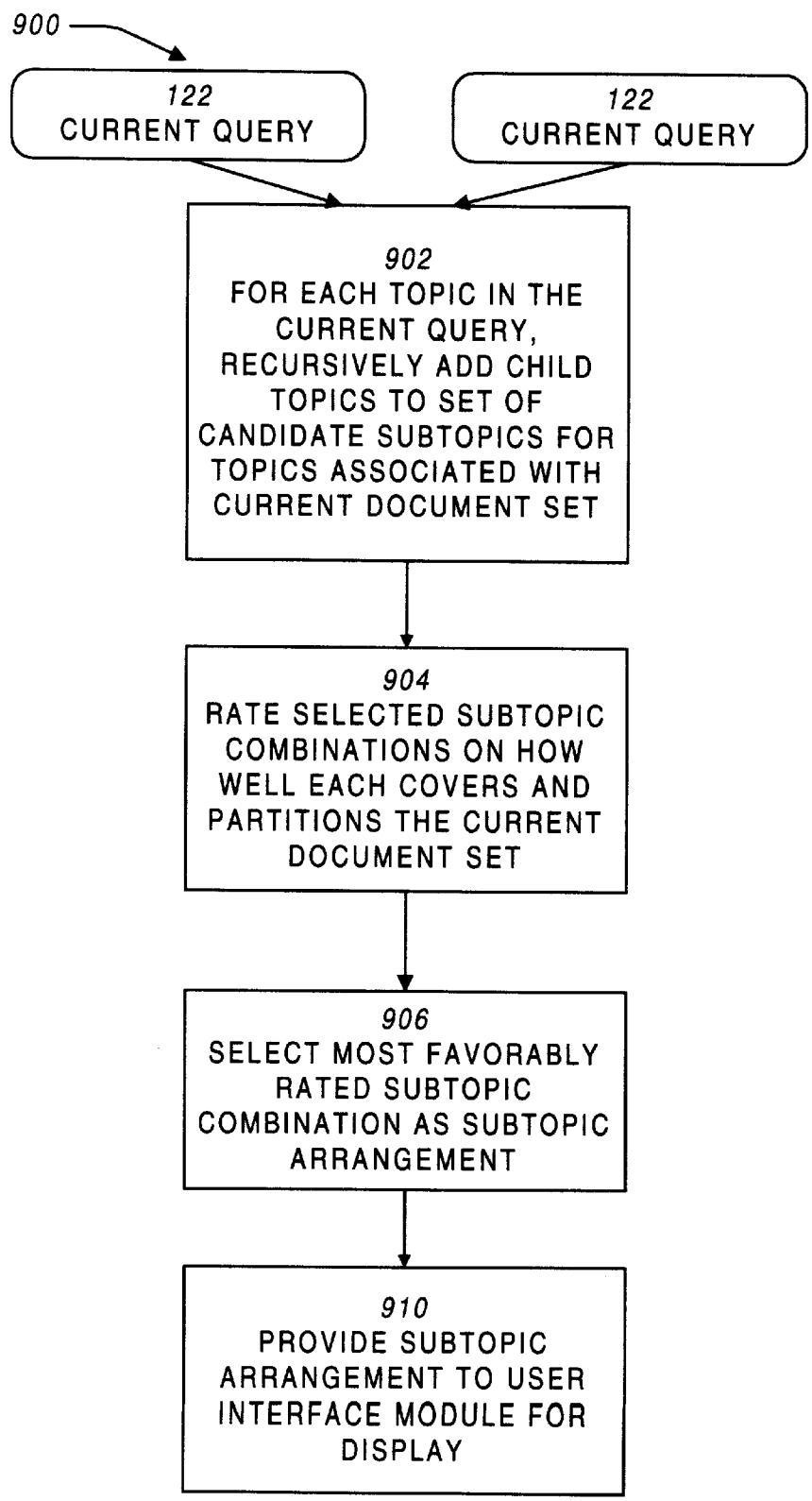
FIG. 9 is a flowgraph of the process of generating a subtopic arrangement.

Subtopic arrangements are created by a similar process to the generation of supertopic arrangements. FIG. 9 illustrates the operation of the dynamic content organization module 160 in creating subtopic arrangements. The input data is the current query 122, and the current document set 152.

For each topic in the current query 122, its child topics (i.e. its subtopics) are added 902 to a set of candidate subtopics, but only if such child topic is associated with at least one document in the document set 152. In this manner, all topics that are associated with documents in the document set 152 become potential subtopics for the subtopic arrangement.

Each of a selected number of subtopic combinations from the candidate set of subtopics is rated 904 as to how well the combination both covers and partitions the current document set. The rating is determined with respect to a set of weighted parameters. Table 2 describes the preferred parameters for rating subtopic combinations:

TABLE 2

Parameters for Rating SubTopics

| Parameter | Example Value | Weight | Description |
|---|---|---|---|
| idealTopicCount | 7 | idealCount-Weight | The ideal number of subtopics included in a subtopic combination. |
| maxTopicCount | 10 | maxTopicCountWeight | The maximum number of subtopics permissible for a subtopic combination. |
| idealOverlap | 0 | overlapWeight | The number of occurrences of documents in the document set that should be associated with more than one subtopic in a subtopic combination. |
| idealCoverage | 100% | coverageWeight | The percentage of documents in the document set that should be associated with at least one subtopic in a subtopic combination. |

The idealTopicCount and maxTopicCount parameters are as described above ith respect to supertopics, but here control the desired number of subtopics in a subtopic combination.

For rating subtopic combinations, it is also desirable to reduce the amount of overlap between subtopics and thereby increase the quality of the partitioning of the document set 152.

The idealCoverage parameter is used specifically to rate subtopic combinations. The idealCoverage parameter is distinct from the idealOverlap parameter, and describes the percentage of documents in the document set 152 that should be associated with at least one subtopic in a subtopic combination. Preferably this parameter value is set at 100% to indicate that all of the documents in the document set 152 should be covered by topics in the topic combination, thereby increasing the accuracy with which the topic combination represents the document set 152. The parameter is then weighted to control its overall importance.

Figure 10:
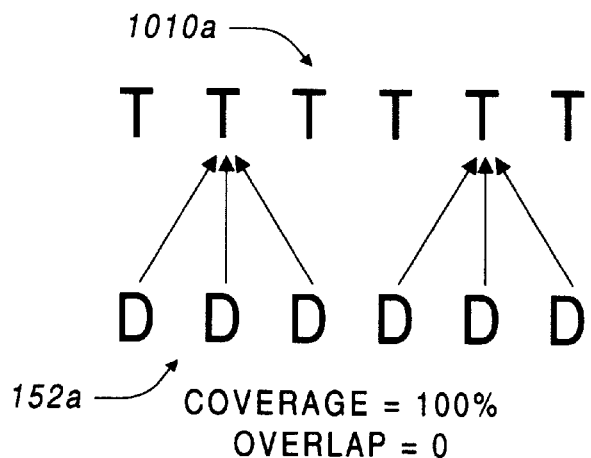
FIG. 10 is an illustration of the differences between coverage and overlap parameters.
Figure 10:
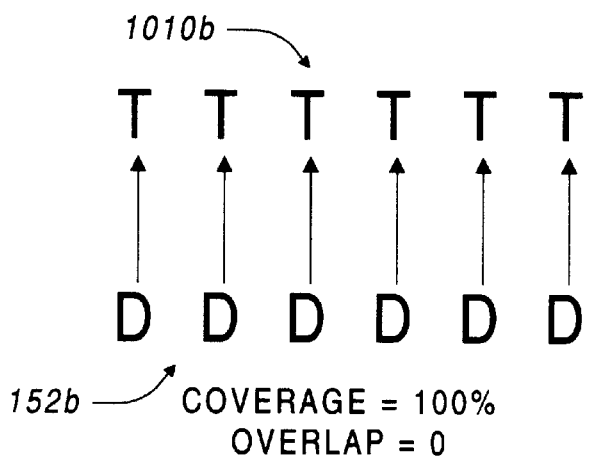
Figure 10:
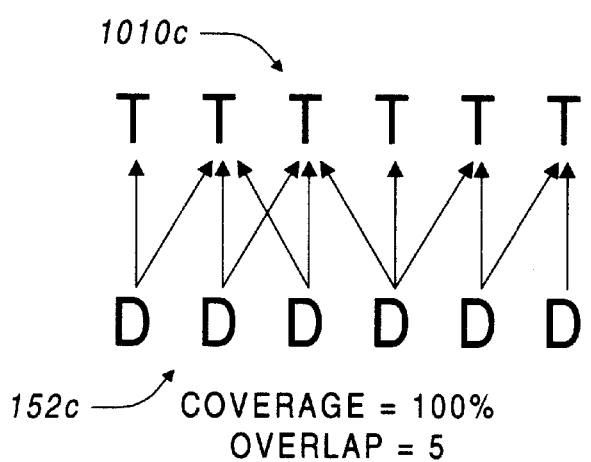

The distinction between the idealOverlap and the idealCoverage parameters is illustrated in FIG. 10. In this figure three groups of topic combinations 1010*a*–1010*c* and documents sets 152*a*–152*c* are shown. Between all of these groups the coverage of the topic combination 1010 is same, 100% of the documents D in the document set 152 are associated with at least one topic T in the topic combination. However, the overlap differs. Topic combination 1010*a* and 1010*b* both have 0 overlap, even though the particular pattern of topic-document associations is considerably different. Topic combination 1010*c* has an overlap of 5, since 5 of the 6 documents D are associated with more than one topic T. Thus, this topic combination 1010*c* would have a less favorable scoring on the idealOverlap parameter than the other topic combinations. In general, topic combinations having a MANY:1 relationship with the document set 152 score less favorably than topic combinations having 1:1 and 1:MANY relationships.

The idealOverlap parameter also has the beneficial effect of removing unnecessary layers of the topic hierarchy in the knowledge base 130 that do not usefully cover the document set 152. This is because any time a subtopic that is included in subtopic combination is associated with more than one document in the document set 152, then that subtopic combination will have a lower score than a subtopic combination which includes the subtopics of the subtopic in question but excludes the subtopic itself. Thus, the idealOverlap parameter improves the rating of high-level candidate topics with subtopic combinations of very specific topics. In considering subtopic combinations, this parameter operates to favorably rate lower level subtopics that more specifically describe a document than a higher level topic. For example, assume that the knowledge base 130 has a topic hierarchy of:

| Topic | Subtopics . . . |
|---|---|
| Animals | |
| Dogs | |
| | Spaniels |
| | Dogs |
| | Siberian Huskies |

Assume further a topic in the current query 122 is "Animals", and of two documents in the document set 152 satisfying the query are one about Spaniels and one about Siberian Huskies, then including "Dog" in a subtopic combination will not usefully distinguish these documents. Such a subtopic combination will be lower rated than a subtopic combination that includes the topics "Spaniels" and "Siberian Huskies." This occurs because former subtopic combination will have a higher count for the idealOverlap parameter than the later subtopic combination, and thus a less favorable rating.

Generally, a subtopic combination is favorably rated if it has about the ideal number of subtopics (as per the idealTopicCount parameter), less than the maximum number of subtopics, and has all documents in the document set 152 associated with a few (ideal, only 1) subtopic in the combination.

The most favorably rated subtopic combination is selected 906 as the subtopic arrangement, and provided 910 to the user interface module 110 for display to the user.

Given the large number of topic combinations that a candidate topic set may have when rating subtopic or supertopic combinations, it is desirable to reduce the number of topic combinations that need to be rated by selecting a number of the topic combinations for evaluation. To reduce the number of topic combinations to be rated in both the subtopic and supertopic generation processes, various pruning heuristics may be applied. For example, as noted above only topic combinations with less then the maximum number of topics need be rated. Similarly a minimum number of topics may also be required for a topic combination for it to be rated.

Also, the rating equation need not be computed for all parameters at once. Instead, iterative scoring may be used. In this approach, the score of a first parameter is computed, the set of topic combinations sorted by this parameter score and only the most favorably scoring topic combinations are scored on the next parameter. This iterative process continuing until all parameters are computed and a final rating is computed across a relatively small set of topic combinations. In addition, re-computation of topic combination scores may be avoided in some cases by saving and reusing the scores when computing scores for subsequent topic combinations that intersect a previously scored topic combination.

Generation of Perspective Topic Arrangements

Figure 11:
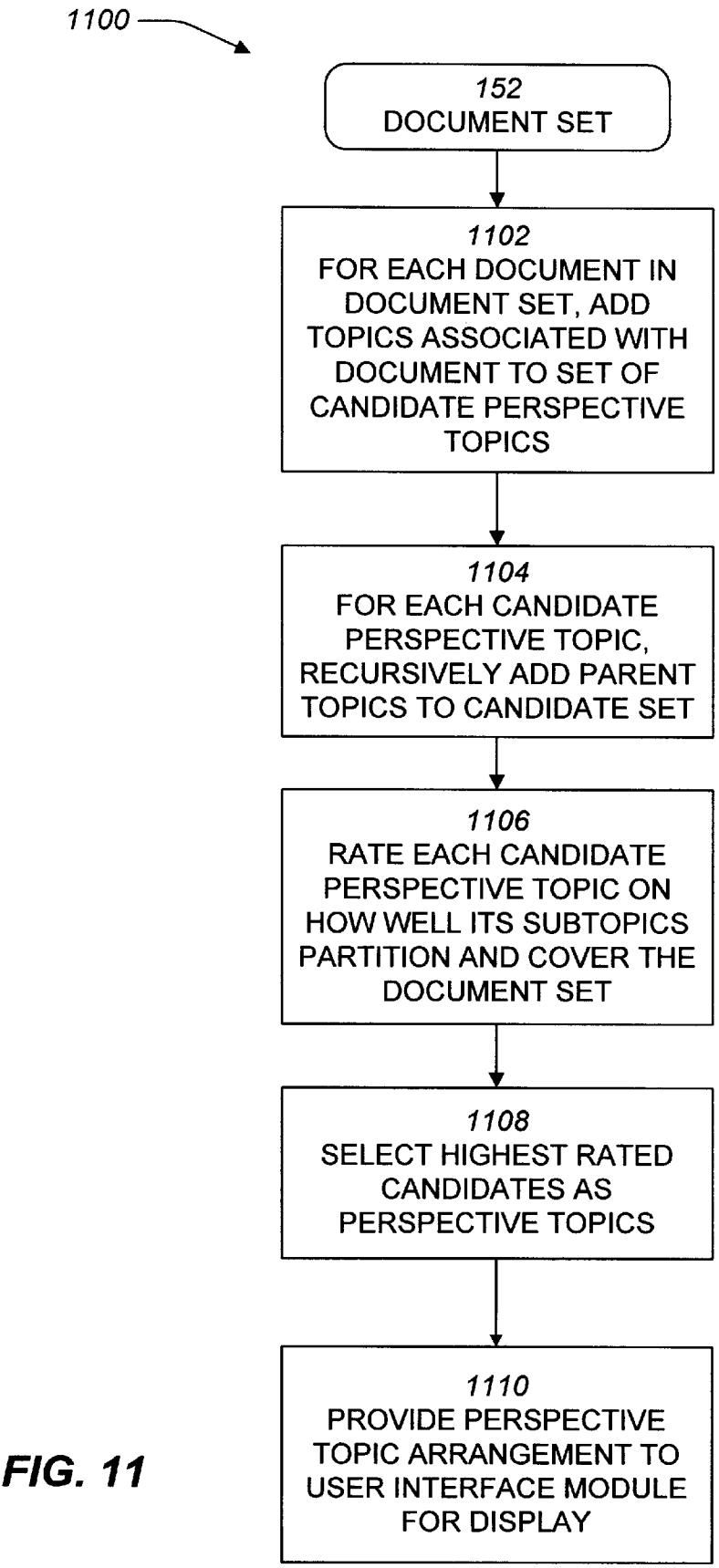
FIG. 11 is a flowgraph of the process of generating a perspective topic arrangement.

Referring now to FIG. 11, there is shown a flowgraph of the operation of the dynamic content organization module 160 to generate a perspective topic arrangement containing a number of perspective topics in accordance with one embodiment of the present invention. The input to the dynamic content organization module 160 is the document set 152 resulting from the current query 122, and the current query 122.

For each document in the document set 152, the dynamic content organization module 160 adds 1102 each of the topics that are associated with that document to a candidate set of perspective topics. This may be done by traversing the document-topic table in the document collection 140 according to the document IDs of the documents in the document set 152, and adding the topics listed in association with each document.

Next, for each candidate perspective topic, the dynamic content organization module 160 adds 1104 each of its parent topics in the knowledge base 130 to the candidate set. This step is performed recursively until there are no more parents of candidate perspective topics in the knowledge base 130 that are not already included in the candidate set. This process expands the candidate set to include all topics possibly relevant to the current query 122 in the candidate set.

The dynamic content organization module 160 rates 1106 each of the candidate perspective topics with respect to how well its subtopics partition and cover the document set 152. Generally, the rating is rating each combination of subtopics of a candidate perspective topic using the subtopic rating scheme described above.

More particularly, to rate a candidate perspective topic, the dynamic content organization module 160 first creates a set of subtopics of the candidate perspective topic by adding each of the candidate topic's child topics in the knowledge base 130 to a candidate subtopic set, as described above. Selected combinations of subtopics from the candidate set are then rating using the parameter weights and values for the subtopic rating scheme.

For each candidate perspective topic, the dynamic content organization module 160 stores the rating for best scoring subtopic combination of that perspective topic as the rating for the candidate perspective topic. Thus, each candidate perspective topic has a single rating based on which of its subtopic combinations best partitions and covers the document set 152 according to the rating parameters.

Generally, a perspective topic is favorably rated if it is a parent topic of a subtopic combination that is favorably rated, using the preferred subtopic rating parameters. Thus, a favorably rated perspective topic will have a subtopic combination with a near ideal number of subtopics less than a maximum number, and good partitioning low number of documents in the document set 152 associated with more than one subtopic) and good coverage (most documents in the document set 152 associated with a subtopic).

Once the candidate perspective topics are rated, the dynamic content organization module 160 selects 1108 the most favorably rated candidate topics as the perspective topics for a perspective topic arrangement. Preferably the dynamic content organization module 160 selects between 3 and 7 of the most favorably rated perspective topics.

The selected perspective topics and their respective subtopic combinations are passed to the user interface module 110 which displays them to the user, for example, in a layout like that illustrated in FIG. 3, or in some other useful format.

As regards optimization of the rating process, in the same manner that the set of possible subtopic combinations of a candidate topic may be pruned, so too can the set of candidate perspective topics be pruned so that only a selected number of candidate perspective topics are rated. This may be done by application of minimum and maximum subtopic constraints on the subtopics of the candidate perspective topics, and iterative scoring of the candidate perspective topics across individual parameters.

Generation of Theme Topic Arrangements

Figure 12:
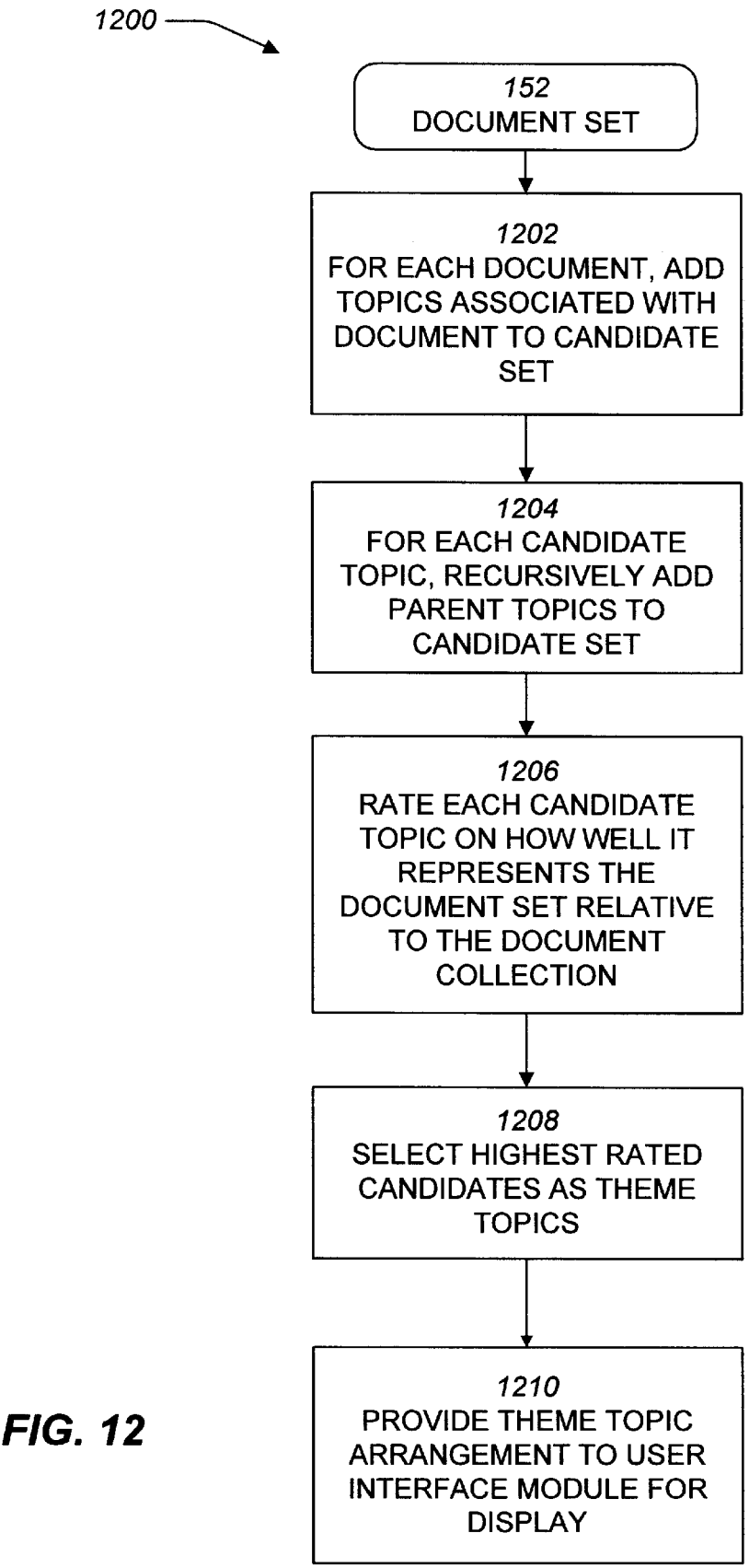
FIG. 12 is a flowgraph of the process of generating a theme topic arrangement.

Referring now to FIG. 12 there is shown a flowgraph of one embodiment of a process 1200 of analyzing the document set 152 to create a theme topic arrangement. The input to the dynamic content organization module 160 is the document set 152 resulting from the current query 122. The general flow for generating a theme topic arrangement is the similar to the flow for generating a perspective topic arrangement. A set of candidate topics is created 1202 initially from the document set 152 by collecting all topics that are associated with documents of the document set 152. The set of candidate theme topics is then expanded 1204 to recursively include all of the parent topics in the knowledge base 130.

Each of the candidate theme topics is then rated 1206 on how well it represents the document set 152 relative to the entire document collection 140.

Generally a theme topic is favorably rated using various rating criteria, as described above. These rating criteria include 1) the ratio of its number of occurrences (i.e. frequency of associations) in the current document set 152 normalized relative to its number of occurrences in the document collection 140; and 2) the frequency of occurrence of the topic in the document set 152 alone (or 'coverage' of the topic). For example using the first criteria, a candidate theme topic that occurs 5 times in the document set and 10 times in the document collection 140 would have a rating of 0.5, which would be less favorable than a rating of 0.8 given to a candidate theme topic which occurs only 4 times in the document set and but 5 times in the document collection 140.

The rating criteria for theme topics can be formalized into parameters as follows:

TABLE 3

Additional Parameters for Rating Theme Topics

| Parameter | Weight | Description |
| --- | --- | --- |
| currentCount | currentCountWeight | The frequency of occurrence of a candidate theme topic in the document set. |
| globalCount | — | The frequency of occurrence of a candidate theme topic in the entire document collection. |

The currentCount parameter is the frequency of occurrence of a candidate theme topic in the document set 152. The globalCount parameter is the frequency of occurrence of the candidate theme topic in the document collection 140 as a whole.

In a preferred embodiment, both rating criteria are used. One implementation of scoring function S for rating a candidate theme topic using both rating criteria is:

$$S = \frac{currentCount * currentCountWeight}{globalCount} + \frac{currentCount * currentCoverageWeight}{currentNumberofDocuments}$$

where currentCoverageWeight is a weighting parameter which controls how significant is coverage of the topic over the document set 152, and currentNumberofDocuments is the number of documents in the document set 152. The first term represents the first criteria, and the second term represents the second criteria.

In an alternative embodiment, instead of scoring a candidate topic using the relative frequency of occurrence of the topic in the document set 152, a comparison function would first select the documents of the document collection 140 associated with a candidate theme topic (e.g. from the topic-document table) and compare these against the documents in the document set 152. The percentage of matches would be taken as the score for the candidate theme topic, weighted and combined with other parameters as desired.

Again, it is not necessary to rate all of the candidate theme topics in the candidate theme topic set, and selecting of a limited number of candidate topics for rating may be employed, using the various pruning techniques described above.

Once the candidate topics are rated, the dynamic content organization module 160 selects 1108 the most favorably rated candidate topics as the theme topics of the theme topic arrangement. The set of theme topics is provided to the user interface module 110 which displays on the display device 109, for example, using a layout as illustrated in FIG. 7, or in any other useful format.

In summary, there has been described a system and method for dynamically organizing the results of a query in an information retrieval system. The system and method provide the user with an improved means of understanding the organization, relationships, and nature of content in a document collection through distinct topic arrangements, and for interactively constructing topic and keyword based queries for further navigating the document collection.

What is claimed is:

1. A computer-implemented method of creating a topic arrangement for a set of documents resulting from a query on a document collection, each document in the document collection associate-d with at least one topic, various ones of the topics having semantically related subtopics, each subtopic being a semantic refinement of its topic, each topic being a semantic generalization of its subtopics, the method comprising:

receiving a set of documents satisfying the query;

receiving a first selection of at least one topic derived from the query;

receiving a user selection of a type of topic arrangement from a plurality of topic arrangements for displaying topics semantically related to the first selected topic;

responsive to the user selection of the type of topic arrangement, selecting a set of topics for the topic arrangement as the set of topics which optimizes a predetermined set of parameters associated with the determined type of topic arrangement and the selected topic; and displaying the topic arrangement including the selected topics.

2. The method of claim 1, wherein the parameters include:

an ideal number of topics in a topic arrangement of the determined type compared to an actual number of topics in the set of topics.

3. The method of claim 2, wherein the parameters include:

an ideal percentage of documents of the document set that should be associated with any of the topics included in the topic arrangement compared to an actual percentage of documents in the document set associated with any of topics in the topic set.

4. The method of claim 2, wherein the parameters include:

an ideal percentage of documents of the document set that should be associated with more than one topic included in the topic arrangement compared to an actual percentage of documents in the document set associated with more than one topic in the topic set.

5. The method of claim 1, further comprising:
receiving a user selection of one of the displayed topics of the displayed topic arrangement;
modifying the query to incorporate the user selected topic to the query to form a modified query; and
processing the modified query on the document collection to select a new set of documents satisfying the modified query.

6. The method of claim 5, wherein modifying the query comprises:
replacing the first selected topic derived from the query with the user selected displayed topic.

7. A computer-implemented method of creating a topic arrangement for a set of documents resulting from a query on a document collection, each document in the document collection associated with at least one topic, various ones of the topics having semantically related subtopics, each subtopic being a semantic refinement of its topic, each topic being a semantic generalization of its subtopics, the method comprising:
receiving a set of documents satisfying the query;
receiving a first selection of at least one topic derived from the query;
displaying a set of topics semantically related to the selected topic, the set of topics including topics that are either a semantic refinement or a semantic generalization of the selected topic;
receiving a user selection of one of the displayed topics;
modifying the query to incorporate the user selected topic to the query to form a modified query; and
processing the modified query on the document collection to select a new set of documents satisfying the modified query.

8. The method of claim 7, wherein modifying the query comprises:
replacing the first selected topic derived from the query with the user selected displayed topic.

9. A computer-implemented method of creating a supertopic arrangement for a set of documents resulting from a query on a document collection, each document in the document collection associated with at least one topic, various ones of the topics having semantically related subtopics, each subtopic being a semantic refinement of its topic, each topic being a semantic generalization of its subtopics, the method comprising:
processing the query to select a set of documents satisfying the query;
receiving a selection of at least one topic derived from the query;
determining the supertopic arrangement as a combination of supertopics that are associated with the documents of the document set and with the selected topic and that optimally generalizes the document set with respect to parameters; and
displaying the supertopic arrangement.

10. The computer implemented method of claim 9, further comprising:
receiving a user specification of a new query term;
conjoining the query term to the query to form a refined query that is a semantic refinement of the query; and
processing the refined query on the document collection to select a new set of documents satisfying the refined query.

11. The method of claim 9, further comprising:
receiving a user selection of one of the displayed list of supertopics;
disjoining the selected supertopic to the query to form a new query that is a semantic generalization of the query; and
processing the new query on the document collection to select a new set of documents satisfying the new query.

12. The method of claim 9, wherein determining the supertopic arrangement comprises:
creating a candidate set of supertopics for the selected topic by recursively including all parent topics of the selected topic in the candidate set;
for each of a plurality of combinations of supertopics of the candidate set of supertopics, rating the combination according to:
a number of supertopics in the combination and the ideal number of supertopics;
a number of supertopics in the combination and the maximum number of supertopics;
a number of documents in the document collection associated with more than one supertopic of the combination; and
selecting a most favorably rated combination as the supertopic arrangement.

13. The method of claim 9, further comprising:
for each of the parameters:
scoring a plurality of combinations of supertopics with respect to the parameter;
selecting a number of the most favorably scored combinations for the parameter; and
scoring only the selected number with respect to the next parameter.

14. A computer-implemented method of creating a subtopic arrangement for a set of documents resulting from a query on a document collection, each document in the document collection associated with at least one topic, various ones of the topics having semantically related subtopics, each subtopic being a semantic refinement of its topic, each topic being a semantic generalization of its subtopics, the method comprising:
processing the query to select a set of documents satisfying the query;
receiving a selection of at least one topic derived from the query;
determining the subtopic arrangement as a combination of semantically related subtopics that are associated with the documents of the document set and with the selected topic and that optimally covers and partitions the document set with respect to parameters including:
an ideal number of subtopics in the combination of subtopics,
a maximum number of subtopics in the combination of subtopics, and
an ideal percentage of the document set that is associated with at least one subtopic of the combination; and
displaying the subtopic arrangement.

15. The method of claim 14, wherein the parameters by which the subtopic arrangement is determined include:
an ideal number of documents of the document collection associated with more than subtopic of the combination of subtopics.

16. The method of claim 14, further comprising:

receiving a user specification of a new query term;

conjoining the query term to the query to form a refined query that is a semantic refinement of the query; and processing the refined query on the document collection to select a new set of documents satisfying the refined query.

17. The method of claim 14, further comprising:

receiving a user selection of a displayed subtopic;

conjoining the selected subtopic to the query to form a refined query that is a semantic refinement of the query; and processing the refined query on the document collection to select a new set of documents satisfying the refined query.

18. The method of claim 17, further comprising iteratively repeating the steps of receiving, conjoining, and processing to iteratively narrow the document set.

19. The method of claim 14, wherein determining the subtopic arrangement further comprises:

creating a candidate set of subtopics for the selected topic by recursively including each child topic of the selected topic in the candidate set that is also a topic associated with a document of the document set;

for each of a plurality of combinations of subtopics of the candidate set of subtopics, rating the combination according to:

a number of subtopics in the combination and the ideal number of subtopics;

a number of subtopics in the combination and the maximum number of subtopics;

a percentage of the documents in the document set that are associated with at least one subtopic of the combination and an ideal percentage; and selecting a most favorably rated combination as the subtopic arrangement.

20. The method of claim 19, further comprising:

rating the combination according to a number of documents in the document collection associated with more than one subtopic of the combination;

wherein combinations for which documents of the document collection are associated few subtopics of the combination are more favorably rated than combinations for which documents of the document collection are associated many subtopics of the combination.

21. A computer-implemented method of creating a topic arrangement of documents resulting from a query, each document associated with a at least one topic, various ones of the topics having semantically related subtopics, each subtopic being a semantic refinement of its topic, the method comprising:

receiving a set of documents satisfying the query;

determining from the set of documents a set of topics associated with the documents, each topic in the set of topics associated with at least one document in the set of documents;

selecting from the set of topics at least one topic having a plurality of semantically related subtopics that partition the set of documents into subsets of documents and that are associated with a substantial portion of the set of documents; and displaying each selected topic and its subtopics.

22. The computer-implemented method of claim 21, wherein selecting from the set of topics at least one topic having a plurality of semantically related subtopics that partition the set of documents into subsets of documents comprises:

determining for each topic a rating as a function of a:

an ideal number of subtopics for a topic;

a number of subtopics of the topic that are associated with the set of documents; and selecting a predefined number of topics having the most favorable ratings.

23. The computer-implemented method of claim 22, wherein determining for each topic a rating as a function, further comprises:

determining for each topic a rating as a function of an ideal percentage of the document set that are associated with subtopics of the topic.

24. The method of claim 21 wherein selecting from the set of topics at least one topic having a plurality of semantically related subtopics that partition the set of documents into subsets of documents comprises:

selecting topics for which the semantically related subtopics partition the set of documents into a number of subsets that does not exceed a maximum number of subsets.

25. A computer-implemented method of creating a topic arrangement of documents resulting from a query, each document associated with at least one topic, various ones of the topics having semantically related subtopics, each subtopic being a semantic refinement of its topic, the method comprising:

processing the query to select a set of documents;

determining from the set of documents a set of topics associated with the documents, each topic in the set of topics associated with at least one document in the set of documents;

for each of a number of topics in the set of topics, rating each of a plurality of combinations of subtopics of the topic as a function of:

a number of subtopics in the combination of subtopics;

a percentage of the documents in the document set associated with at least one subtopic in the combination of subtopics;

selecting a number of most favorably rated topics; and displaying the selected topics.

26. The method of claim 25, further comprising:

rating each of a plurality of combinations of subtopics of the topic as a further function of:

a number of documents in the set of documents associated with more than one subtopic in the combination of subtopics.

27. The method of claim 26, further comprising:

rating each of a plurality of combinations of subtopics of the topic as a further function of:

an ideal number of documents in the set of documents that should be associated with more than one subtopic in the combination of subtopics;

an ideal number of subtopics that should be the combination of subtopics; and an ideal percentage of the documents in the document set that should be associated with more than one subtopic in the combination of subtopics.

28. A computer-implemented method of creating a topic arrangement of documents resulting from a query, each document associated with a plurality of descriptive topics, various ones of the topics having semantically related subtopics, the method comprising:

processing the query to produce a first set of documents satisfying the query;

determining from the set of documents a set of topics, each topic in the set associated with at least one document in the first set of documents;

selecting from among the set of topics at least one topic that is associated with a second set of documents that is substantially similar to the unorganized first set of documents resulting from the query; and displaying the at least one selected topic.

29. A computer-implemented method of creating a topic arrangement of documents resulting from a query in an information retrieval system including a document collection containing a plurality of documents, each document associated with a plurality of descriptive topics, various ones of the topics having semantically related subtopics, the method comprising:

processing the query to select a first set of documents less than the plurality of documents, and which satisfy the query;

determining from the set of documents a set of topics, each topic in the set associated with at least one document in the first set of documents;

selecting from among the set of topics a number of topics having a highest normalized frequency of occurrence in the first set of documents relative to a frequency of occurrence of the topic in the plurality of documents; and displaying the selected number of topics.

30. An information retrieval system, comprising:

a document collection including a plurality of documents, each document associated with at least one topic;

a knowledge base including a plurality of topics, various ones of the topics having semantically related subtopics;

a user interface module that receives a query including a plurality of query terms; and a dynamic content analysis module communicatively coupled to receive a set of documents satisfying the query, a first selected topic derived from the query terms, and a user selection of a type of topic arrangement, from a plurality of topic arrangements for displaying topics semantically related to the first selected topic, selecting a set of topics of the knowledge base for the topic arrangement as the set of topics which optimizes a predetermined set of parameters associated with the determined type and the selected topic, and display the topic arrangement including the selected topics.

31. An information retrieval system, comprising:

a document collection including a plurality of documents, each document associated with at least one topic;

a knowledge base including a plurality of topics, various ones of the topics having semantically related subtopics;

a user interface module that receives a query including a plurality of query terms; and a dynamic content analysis module communicatively coupled to receive a set of documents satisfying the query, and to receive a first selected topic derived from the query terms, determine a supertopic arrangement as a combination of supertopics that are associated with the documents of the document set and with the selected topic and that optimally generalizes the document set with respect to parameters, and provide the supertopic arrangement to the user interface module to display.

32. An information retrieval system, comprising:

a document collection including a plurality of documents, each document associated with at least one topic;

a knowledge base including a plurality of topics, various ones of the topics having semantically related subtopics;

a user interface module that receives a query including a plurality of query terms; and a dynamic content analysis module communicatively coupled to receive a set of documents satisfying the query, to receive a first selected topic derived from the query terms, to determine a subtopic arrangement as a combination of semantically related subtopics that are associated with the documents of the document set and with the selected topic and that optimally covers and partitions the document set with respect to parameters including an ideal number of subtopics in the combination of subtopics, a maximum number of subtopics in the combination of subtopics, and an ideal percentage of the document set that is associated with at least one subtopic of the combination, and to display the subtopic arrangement.

33. An information retrieval system, comprising:

a document collection including a plurality of documents, each document associated with at least one topic;

a knowledge base including a plurality of topics, various ones of the topics having semantically related subtopics;

a user interface module that receives a query including a plurality of query terms; and a dynamic content analysis module communicatively coupled to receive a set of documents satisfying the query, and to determine from the set of documents a set of topics, each topic in the set of topics associated with at least one document in the set of documents, and to select at least one topic from the set of topics that has semantically related subtopics that optimally partition the set of documents into a plurality of subsets, the dynamic content analysis module providing the selected at least one topic to the user interface module to display.

34. The system of claim 33, further comprising:

a query analysis module communicatively coupled to receive the query from the user interface module and to process the query to select the set of documents from the document collection that satisfy the query terms.

35. The system of claim 34, wherein the query analysis module receives a query containing a plurality of topics as query terms, determines for each topic in the query a subset of documents of the knowledge base associated with the topic, produces the document set as the intersection or union of the subsets of documents.

36. An information retrieval system, comprising:

a document collection including a plurality of documents, each document associated with at least one topic;

a knowledge base including a plurality of topics, various ones of the topics having semantically related subtopics;

a user interface module that receives a query including a plurality of query terms;

a query analysis module communicatively coupled to receive the query from the user interface module and to process the query to select a first set of documents from the document collection that satisfy the query terms; and a dynamic content analysis module communicatively coupled to receive the set of documents and to determine from the set of documents a set of topics, each topic in the set of topics associated with at least one document in the set of documents, and to select from among the set of topics a number of topics having a highest normalized frequency of occurrence in the first set of documents relative to a frequency of occurrence of the topic in the plurality of documents.

* * * * *